(12) United States Patent
Akita et al.

(10) Patent No.: US 10,724,942 B2
(45) Date of Patent: Jul. 28, 2020

(54) INSPECTION APPARATUS AND INSPECTION METHOD

(71) Applicant: Kabushiki Kaisha Toshiba, Minato-ku (JP)

(72) Inventors: Masato Akita, Kawasaki (JP); Takamitsu Sunaoshi, Yokohama (JP); Misato Ishikawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 282 days.

(21) Appl. No.: 15/687,924

(22) Filed: Aug. 28, 2017

(65) Prior Publication Data

US 2018/0231456 A1 Aug. 16, 2018

(30) Foreign Application Priority Data

Feb. 10, 2017 (JP) ................. 2017-023209

(51) Int. Cl.
| | | |
|---|---|---|
| *G01N 21/13* | (2006.01) | |
| *B07C 5/36* | (2006.01) | |
| *G01N 35/00* | (2006.01) | |
| *G01N 21/07* | (2006.01) | |

(52) U.S. Cl.
CPC .............. *G01N 21/13* (2013.01); *B07C 5/36* (2013.01); *G01N 35/0099* (2013.01); *G01N 21/07* (2013.01); *G01N 2021/135* (2013.01)

(58) Field of Classification Search
None
See application file for complete search history.

(56) References Cited

U.S. PATENT DOCUMENTS

| 7,442,030 B2 | 10/2008 | Kinoshita et al. |
| 7,874,782 B2 | 1/2011 | Hashimoto |
| 8,580,195 B2 | 11/2013 | Frey et al. |
| 2009/0054222 A1* | 2/2009 | Zhang .................. C40B 30/10 494/17 |

(Continued)

FOREIGN PATENT DOCUMENTS

| JP | 2000-275256 | 10/2000 |
| JP | 2005-304303 | 11/2005 |

(Continued)

OTHER PUBLICATIONS

Extended Search Report dated Jun. 11, 2018 in European Patent Application No. 17187034.8.

*Primary Examiner* — Kathryn Wright
(74) *Attorney, Agent, or Firm* — Oblon, McClelland, Maier & Neustadt, L.L.P.

(57) ABSTRACT

According to one embodiment, an inspection apparatus includes a socket, a first arm, and a recognition device. The socket has at least one container holding part for holding a container containing an object. The first arm includes at least two links of which ends are connected. The first arm is able to install the container into the container holding part when the links are in a first posture and to reinstall the container into the container holding part when the links are in a second posture different from the first posture. The recognition device obtains at least recognition results indicating respective positions of the object when the container is installed into the container holding part in the first posture and the second posture.

10 Claims, 10 Drawing Sheets

(56) References Cited

U.S. PATENT DOCUMENTS

| | | |
|---|---|---|
| 2010/0111649 A1 | 5/2010 | Minami et al. |
| 2014/0170756 A1 | 6/2014 | Petoe et al. |
| 2015/0111198 A1 | 4/2015 | Brisebat et al. |
| 2017/0269112 A1* | 9/2017 | Gerstel ................ B04B 5/0414 |

FOREIGN PATENT DOCUMENTS

| | | | |
|---|---|---|---|
| JP | 3920274 | 5/2007 | |
| JP | 4098338 | 6/2008 | |
| JP | 5566484 | 8/2014 | |
| WO | WO 2013/027071 A1 | 2/2013 | |
| WO | WO 2013/132195 A1 | 9/2013 | |
| WO | WO-2016016109 A2 * | 2/2016 | ............ B01F 5/0057 |

* cited by examiner

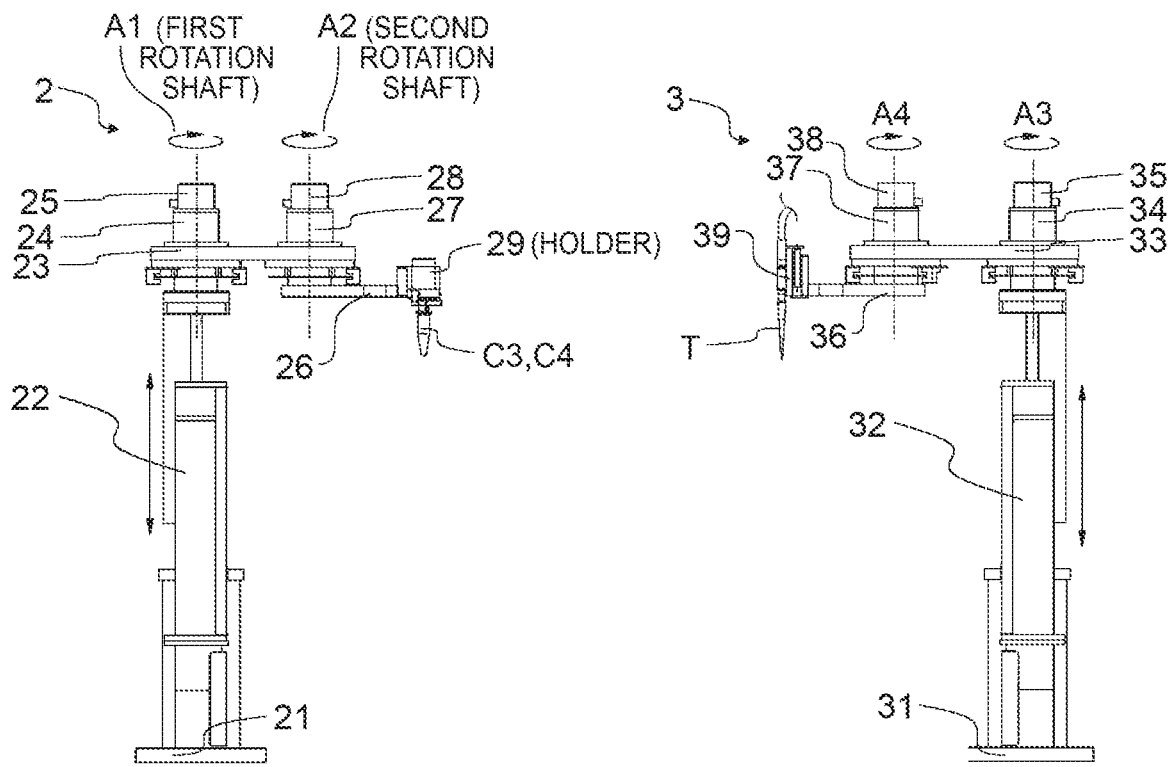
FIG. 3A
FIG. 3B
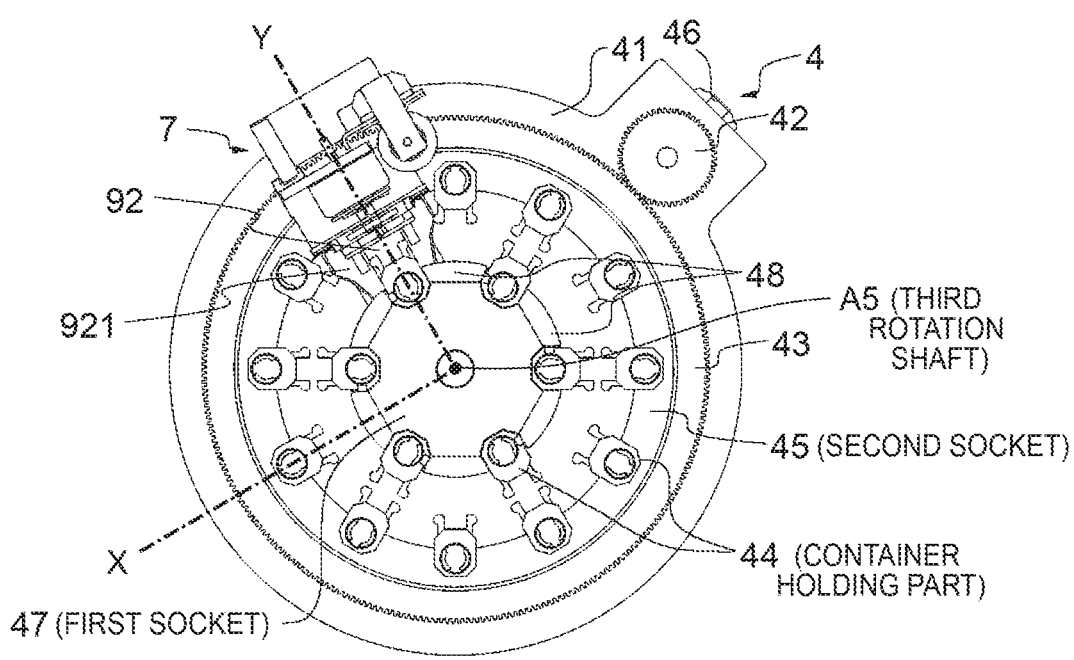
FIG. 4

INSPECTION APPARATUS AND INSPECTION METHOD

CROSS-REFERENCES TO RELATED APPLICATION

This application is based upon and claims the benefit of priority from Japanese Patent Application No. 2017-023209 filed on Feb. 10, 2017; the entire contents of which are incorporated herein by reference.

FIELD

Embodiments described herein relate generally to an inspection apparatus and an inspection method.

BACKGROUND

Non-contact detection means such as an image sensor or a laser scanner is often used in order to detect the amount of a specimen or the position of a specimen (for example, unevenness of the specimen) in a container installed in an inspection apparatus. Generally, in order to detect unevenness of a specimen in a container after treatment with a centrifugal separator or the like, three-dimensional position information is necessary. For example, there is a method for providing image sensors in a plurality of directions to detect unevenness of a specimen. However since a stirring mechanism, a Magnetic separator or the like is installed, there is a case that the specimen cannot foe detected from a desired direction, therefore, although there is a method for changing the direction to an easy-to-see direction fey providing a mechanism for rotating the container, an inspection apparatus becomes bulky and costs thereof increase.

BRIEF DESCRIPTION OF THE DRAWINGS

FIGS. 3A and 3B are schematic diagrams illustrating an example of a tube arm and a pipettor arm.

FIG. 4 is a schematic diagram illustrating an exemplary rotary tube socket.

DETAILED DESCRIPTION

Figure 1:
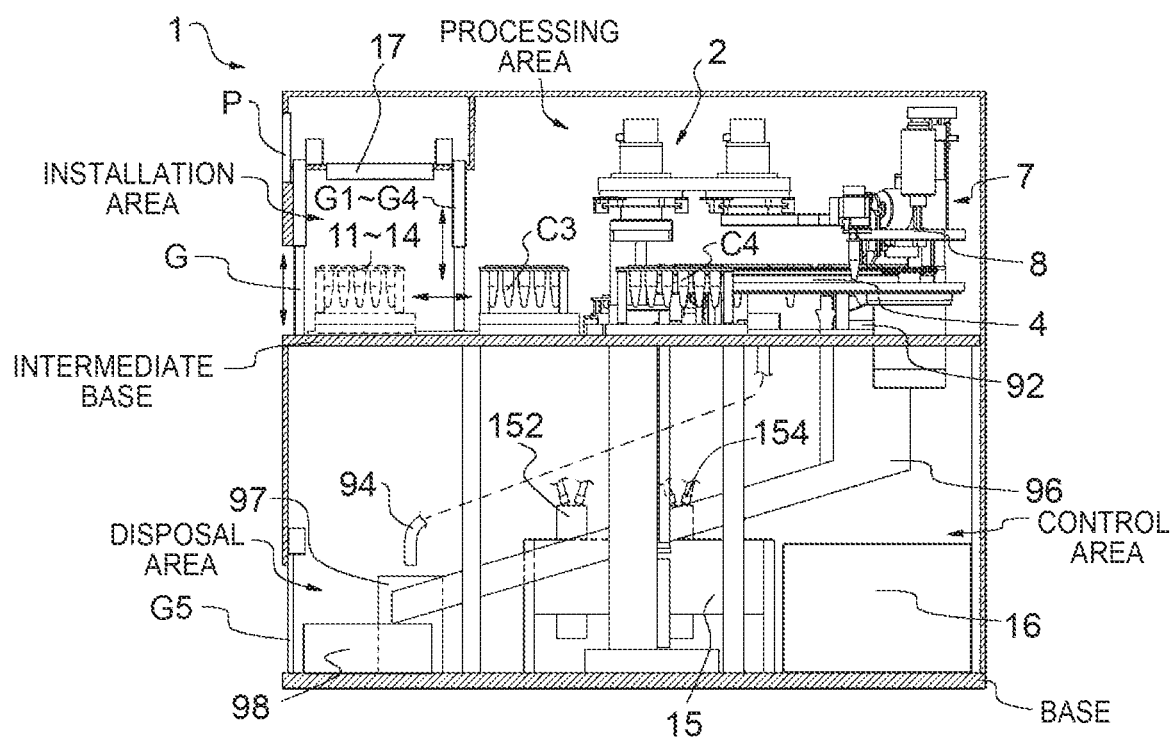
FIG. 1 is a cross-sectional view of an inspection apparatus according to a first embodiment when viewed from a lateral direction.

According to one embodiment, an inspection apparatus includes a socket, a first arm, and a recognition device. The socket has at least one container holding part for holding a container containing an object. The first arm includes at least two links of which ends are connected. The first arm is able to install the container into the container holding part when the links are in a first posture and to reinstall the container into the container holding part when the links are in a second posture different from the first posture. The recognition device obtains at least recognition results indicating respective positions of the object when the container is installed into the container holding part in the first posture and the second posture.

Hereinafter, an inspection apparatus according to embodiments will be described with reference to the drawings. Those with the same symbols indicate similar items. Note that the drawings are schematic or conceptual, and thus a relationship between the thickness and the width of each part or a ratio coefficient of the size between parts is not necessarily the same as actual ones. Even in the case of representing the same part f there are cases where dimensions and ratio coefficients of the parts are different from each other depending on the drawing.

First Embodiment

An inspection apparatus according to a first embodiment will be described with reference to FIGS. 1 to 15.

Figure 2:
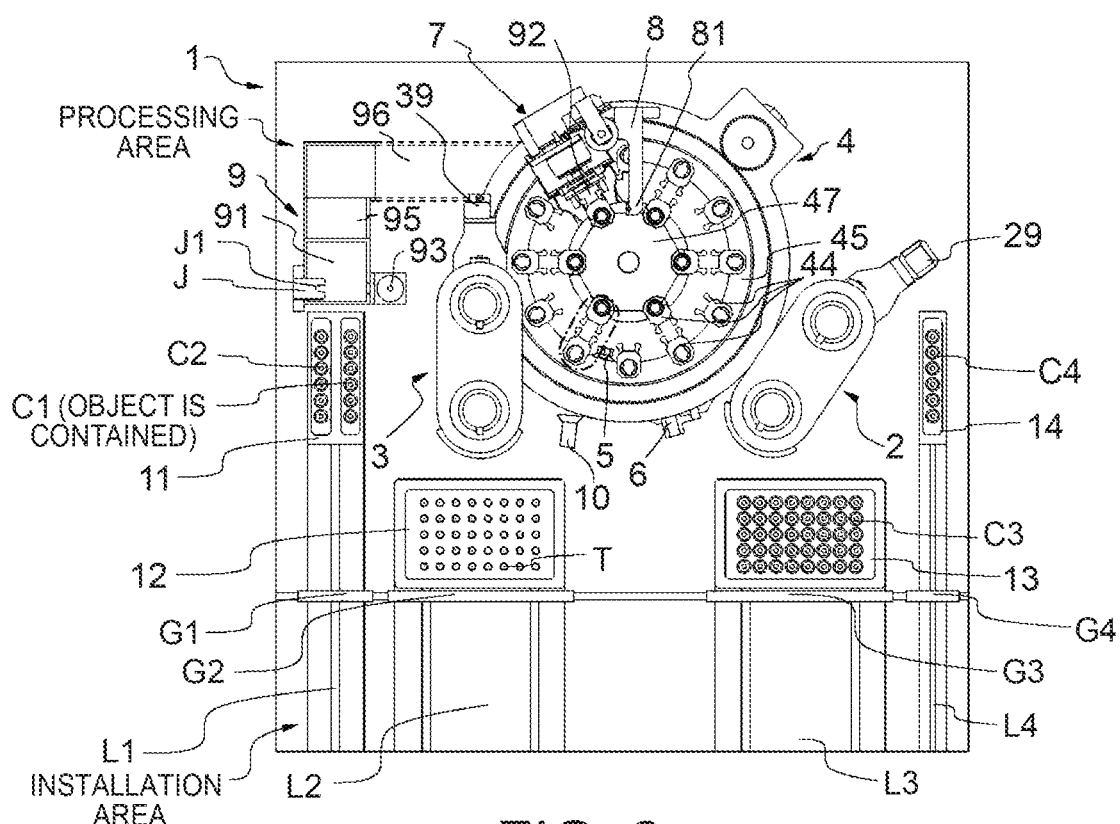
FIG. 2 is a top view of a processing area of the inspection apparatus according to the first embodiment when viewed from the above.

FIG. 1 is a cross-sectional view of an inspection apparatus according to the first embodiment when viewed from a lateral direction. FIG. 2 is a top view of a processing area of the inspection apparatus according to the first embodiment when viewed from the above.

As illustrated in FIG. 1, an inspection apparatus 1 is divided into an upper layer and a lower layer with an intermediate base as a boundary. The upper layer is provided on the intermediate base, and includes an installation area (also referred to as a first area) and a processing area (also referred to as a second area). The lower layer is provided on a base, and includes a disposal area (also referred to as a third area) and a control area (also referred to as a fourth area). The inspection apparatus 1 conveys a plurality of cartridges installed in the installation area to the processing area and processes a specimen in a tube loaded into the cartridge in the processing area. Then, in order to ascertain the position of the specimen in the tube, the position of the specimen immediately after processing is recognised by a recognition device. Furthermore, an installation place of the tube is changed on a rotary tube socket to further recognize the position of the specimen by the recognition device. The recognition device and the rotary tube socket will be described later. Thereafter, the specimen is collected from the tube, and after collecting the specimen, the tube is disposed to the disposal area.

As illustrated in FIGS. 1 and 2, the installation of the inspection apparatus 1 is installed with a conveyor cartridge 11 (also referred to as a first cartridge) for loading a plurality of collection containers and specimen containers, a chip cartridge 12 for loading a plurality chips (also referred to as a second cartridge), a centrifugal tube cartridge 13 for loading a plurality of centrifugal tubes (also referred to as a third cartridge) and a magnetic bead tube cartridge 14 (also referred to as a fourth cartridge) for loading a plurality of magnetic bead tubes containing magnetic beads therein. Each of the cartridges is placed on a cartridge conveying mechanism (not illustrated), passes through guide rails (also referred to as first to fourth guide rails) and is conveyed to the processing area. Respective gates are provided at a boundary between the installation area and the processing area (also referred to as first to fourth gates).

In the processing area, a tube arm 2, a pipettor arm 3, a rotary tube socket 4 which is rotationally driven about a rotation shaft, a magnetic separator 5, a stirrer 6, a holding knob operation part 7, a dispensing arm 8, a disposal part 9, and the recognition device 10 are located.

In the disposal area, a disposal duct, and a disposal pipe connected to the disposal part 9, a collection box for collecting the waste, a liquid waste tank for storing the liquid waste and the like are located.

In the control area, the liquid transporting part 15 including a cylinder pump for pipettor and a control device 16 are located.

First, the installation area will be described in detail. The installation area is airtightly partitioned by an opening and closing mechanism of the gates, and includes an installation gate G provided between the apparatus and the outside, and to fourth gates between the installation area and the processing area. The installation area includes a sterilizer 17 to ensure sterility as compared to the outside of the apparatus. Each of the cartridges carried in from the installation gate G is placed on the cartridge conveying mechanism (not illustrated).

Then, each of the cartridges passes on the guide rail and is conveyed into the processing area via the first to fourth gates.

More specifically, the first cartridge 11 passes through a first guide rail L1 and is conveyed between the processing area and the installation area via a first processing gate G1. Similarly, the second cartridge 12 passes through a second guide rail L2 and is conveyed between the processing area and the installation area via a second processing gate G2. The third cartridge 13 passes through a third guide rail L3 and is conveyed between the processing area and the installation area via a third processing gate S3. The fourth cartridge 14 passes through a fourth guide rail L4 and is conveyed between the processing area and the installation area via a fourth processing gate G4.

The first to fourth cartridges are, for example, a stand capable of loading a plurality of containers or chips, and allowing each of the containers to be removed from above therefrom. The first to fourth guide rails are installed on the intermediate base. The first to fourth guide rails connect between the installation area and the processing area, and guide cartridges placed on respective cartridge conveying mechanisms to the processing area. The cartridge conveying mechanism is, for example, a linear motion mechanism including a motor and moves on a guide rail. When the respective cartridges are conveyed into the processing area, each of the first to fourth gates is opened by an opening/closing mechanism (not illustrated). The respective cartridges are thereby conveyed into the processing area. The installation gate G and the first to fourth gates may be operated by an operator (also referred to as a user) using an operation panel P installed on an outer surface of the inspection apparatus 1, for example.

The first cartridge 11 is loaded with a plurality of specimen containers C1 Containing specimens and collection containers C2 for collecting processed specimens. The second cartridge 12 is loaded with a plurality of chips T. The chip T is mounted to a tip of a pipettor that dispenses a solution. Replacement of the chip T prevents contamination of the specimen. The third cartridge 13 is loaded with a plurality of centrifugal tubes C3. The centrifugal tube C3 is a container for containing a specimen and having an opening at an upper part thereof. The fourth cartridge 14 is loaded with a plurality of magnetic bead tubes C4. Magnetic beads are capable of processing with less contamination compared to separation by gravity since the beads are gathered by the magnetic force of a permanent magnet. Tube shapes of the centrifugal tube C3 and the magnetic bead tube C4 are substantially the same. The centrifugal tube C3 and the magnetic bead tube C4 may be collectively referred to as tubes.

Next, the processing area will be described in detail. The processing area is an area for processing specimen containers loaded in the cartridges.

In the processing area, the tube arm 2, the pipettor arm 3, the rotary tube socket 4 which is rotationally driven about the rotation shaft, the magnetic separator 5, the stirrer 6, the holding knob operation part 7, the dispensing arm 8, the disposal part 9 and the recognition device 10 are located.

The tube arm 2 installs a plurality of centrifugal tubes C3 loaded in the third cartridge 13 or a plurality of magnetic bead tubes G4 loaded in the fourth cartridge 14 to the rotary tube socket 4.

FIG. 3A is a schematic diagram illustrating an example of the tube arm 2. As illustrated in FIG. 3A, the tube arm 2 includes a tube arm base 21, a first linear motion mechanism 22, a first link 23, a first motor 24, a first encoder 25, a second link 26, a second motor 27, a second encoder 28 and a first holding mechanism 29.

The tube arm base 21 is installed on the base. The first linear motion mechanism 22 has a lower end connected to the tube arm base 21 and an upper end connected to the first link 23. The first linear motion mechanism 22 moves the first link 23 in a height direction perpendicular to the intermediate base. The first linear motion mechanism 22 has a linear motion motor. The first motor 24 is connected to a base end of the first link 23. For example, a bearing (not illustrated) is attached between the first motor 24 and the first link 23. A rotation shaft of the first motor 24 is connected to an upper end of the first linear motion mechanism 22. The first link 23 is rotatably driven about a first rotation axis A1 (this axis can be a "first rotation shaft") of the first motor 24 in a horizontal plane substantially parallel to the intermediate base. The first motor 24 is installed with a first encoder 25 for measuring its rotation angle. It is preferable that a direction of the first rotation axis A1 and a driving direction of the first linear motion mechanism 22 are substantially parallel.

The second motor 27 is installed at a tip of the first link 23. The second motor 27 is installed with a second encoder 28 for measuring its rotation angle. For example, a bearing (not illustrated) is attached between a rotation shaft of the second motor 27 and the first link 23. The rotation shaft of the second motor 27 is connected to a base end of the second link 26. The second link 26 is rotatably driven about a second rotation axis A2 (this axis can be a "second rotation shaft") of the second motor 27 in a plane substantially parallel to the intermediate base. It is preferable that the planes in which the first link 23 and the second link 26 are rotatably driven are substantially parallel.

The first holding mechanism 29 (this mechanism can be a "holder") for holding a centrifugal tube or a magnetic bead tube is connected to a tip of the second link 26. The first holding mechanism 29 is formed by, for example, two rod bodies that can open and close. An inner diameter part of the centrifugal tube or the magnetic bead tube may be held by opening the rod bodies. A tube may be held by a knob (not illustrated) or the like installed in the first holding mechanism. Alternatively, a tube may be clamped and held with two claws. By the tube arm 2, a centrifugal tube or a magnetic bead tube can be attached to or detached from a tube holding part of the rotary tube socket, which will be described later. Furthermore, the centrifugal tube or the magnetic bead tube attached to the tube holding part may be moved and attached to another tube holding part by the tube arm 2.

The tube arm base 21 or the first linear motion mechanism 22 pierces the intermediate base and supports the first link 23, the second link 26 and the like in the processing area.

The tube arm 2 is connected to the control device 16, and driving of the first linear motion mechanism 22, the first motor 24, the second motor 27 and the first holding mechanism 29 of the tube arm 2 is controlled. The control device 16 will be described later.

FIG. 3B is a schematic diagram illustrating an example of the pipettor arm 3. The pipettor arm 3 (this arm can be a "second arm") mounts the chip T loaded in the second cartridge 12 to a tip of a pipettor's nozzle. Then, a specimen is extracted (or sucked) from the specimen container loaded into the first cartridge by the chip and the pipettor's nozzle, and the specimen is injected into a tube installed in the rotary tube socket.

The pipettor arm 3 further sucks the processed specimen from the centrifugal tube C3 at the rotary tube socket 4, and injects it into a collection container C2 loaded in the first cartridge 11.

As illustrated in FIG. 3B, the pipettor arm 3 includes a pipettor arts base 31, a second linear motion mechanism 32, a third link 33, a third motor 34, a third encoder 35, a fourth link 36, a fourth motor 37, a fourth encoder 38 and a pipettors nozzle 39.

The pipettor arm base 31 is installed on the base. The second linear motion mechanism 32 has a lower end connected to the pipettor arm base 31 and an upper end connected to the third link 33. The second linear motion mechanism 32 moves the third link 33 in a height direction perpendicular to the intermediate base. The second linear motion mechanism 32 has a linear motion motor. A third motor 34 is connected to a base end of the third link 33. For example, a bearing (not illustrated) is attached between the third motor 34 and the third link 33. A rotation shaft of the third motor 34 is connected to an upper end of the second linear motion mechanism 32. The third link 33 rotatably driven in a horizontal plane substantially parallel to the intermediate base about a third rotation axis A3 of the third motor 34. In the third motor 34, a third encoder 35 for measuring the rotation angle thereof is installed. An axial direction of the third rotation axis A3 and a driving direction of the second linear motion mechanism are preferably substantially parallel.

A fourth motor 37 is installed at a tip of the third link 33. The fourth motor 37 is installed with a fourth encoder 38 for measuring its rotation angle. For example, a bearing (not illustrated) is attached between a rotation shaft of the fourth motor 37 and the third link 33. A base end of the fourth link 36 is connected to the rotation shaft of the fourth motor 37. The fourth link 36 is rotatably driven about a fourth rotation axis A4 of the fourth motor 37 in a plane substantially parallel to the intermediate base. It is preferable that the planes in which the third link 33 and the fourth link 36 are rotatably driven are substantially parallel.

The pipettor's nozzle 39 is connected to a tip of the fourth link 36. A cylinder pump for pipettor is connected to the pipettor's nozzle 39 in order to change the pressure inside the pipettor. The specimen is sucked or discharged by operation of this cylinder pump for pipettor.

The pipettor's nozzle 39 may be mounted to the chip T by pressing the pipettor's nozzle 39 against the chip T from the vertical direction to fit it. For example, the pipettor arm 3 is driven to move the pipettor's nozzle 39 over the second cartridge 12 loaded with the chip T. Then, by driving the second linear motion mechanism 32, the pipettor's nozzle 39 is lowered to be pressed against and fitted to the chip T from the vertical direction.

For example, a hollow protrusion (not illustrated) is provided in the pipettor's nozzle 39. The pipettor's nozzle 39 may be fitted by pressing the protrusion against the inner diameter part of the chip T. When the chip T is detached from the pipettor's nozzle 39, the chip T is detached by a chip detaching jig J (see FIG. 2). The chip detaching jig J is, for example, a plate body including a notch J1 according to the shape of the protruding part. The notch J1 is inserted from a side surface of the protrusion to the fitting part. By moving the second linear motion mechanism 32 upward in this an edge of the chip T comes into contact with the chip detaching jig J and the chip T is detached. The chip detaching jig J is preferably provided near a first disposal port for disposing of the chip T. The first disposal port will foe described later.

Furthermore, this protrusion can be put in and out in the vertical direction, and the protrusion is put out when the chip T is mounted. When the chip T is detached and disposed, the chip T may be detached by bringing an outer edge of the pipettor's nozzle 39 into contact with an edge of the chip T by retracting the protrusion fitted with, the chip T into the pipettor's nozzle 39. In this case, a chip can be detached without using the chip detaching jig J.

The pipettor arm base 31 or the second linear motion mechanism 32 pierces the intermediate base and supports the third link 33, the fourth link 36 and the like in the processing area.

The pipettor arm 3 is connected to the control device 16, and driving of the second linear motion mechanism 32, the third motor 34, the fourth motor 37, the pipettor's nozzle 39 and the cylinder pump for pipettor of the pipettor arm 3 is controlled. The control device 16 will be described later.

The rotary tube socket 4 rotates and processes a tube containing a specimen attached by the tube arm 2.

FIG. 4 is a schematic diagram illustrating an example of the rotary tube socket 4. As illustrated in FIG. 4, the rotary tube socket 4 includes a tube socket base 41, a first gear 42, a second gear 43, a plurality of tube holding parts 44 (also referred to as container holding parts), a socket ring 45 supporting the tube holding parts 44, a fifth motor 46, and a centrifugal separator 47 having a plurality of tube holding parts 44 and positioned inside the socket ring.

The rotary tube socket 4 is an annular socket having the plurality of tube holding parts 44 for holding the centrifugal tube C3 or the magnetic bead tube C4. On the tube socket base 41, there is the first gear 42 and the second gear 43 via a bearing (not illustrated). Furthermore, the first gear 42 is rotated by the fifth motor 46, and the socket ring 45 on the second gear 43 engaging with the first gear 42 is thereby rotated. The socket ring 45 is installed with a plurality of tube holding parts 44. A magnetic bead tube C4 held by the tube holding part 44 rotates about a fifth rotation axis A5 (this axis can be a "third rotation shaft") which is the center of the rotary tube socket 4. The centrifugal separator 47 is arranged inside the socket ring 45. The centrifugal separator 47 has a plurality of tube holding parts 44 for holding a centrifugal tube C3 on an outer peripheral part thereof. On both sides of each tube holding part 44 of the centrifugal separator 47, a stopper 48 is provided. The centrifugal separator 47 has a sixth motor and a sixth encoder which are not illustrated. The centrifugal tube C3 held by a tube holding part 44 of the centrifugal separator 47 rotates about a rotation shaft which substantially coincides with the fifth rotation axis A5. In other words, the rotary tube socket 4 has a double configuration of the centrifugal separator 47 that rotates a plurality of tube holding parts on an inner periphery about the fifth rotation axis A5 and the socket ring 45 that rotates a plurality of tube holding parts on an outer periphery. In addition, the heights of the plurality of tube holding parts 44 supported by the socket ring 45 and the plurality of tube holding parts 44 arranged in the centrifugal separator 47 are preferably substantially equal. For example, in the centrifugal separator 47, six tube holding parts 44 are installed at equal intervals in an annular shape. In the socket ring 45, twelve tube holding parts 44 are installed at equal intervals in an annular shape. The number of tube holding parts is not limited these numbers, and can be appropriately changed according to a scale or other specifications of the inspection apparatus 1. The centrifugal separator 47 and the socket ring 45 are separately rotatable.

A magnetic bead tube C4 is installed in one of the tube holding parts 44 of the socket ring 45 by the tube arm 2. A centrifugal tube C3 is installed in one of the tube holding parts 44 of the centrifugal separator 47 by the tube arm 2.

Figure 5:
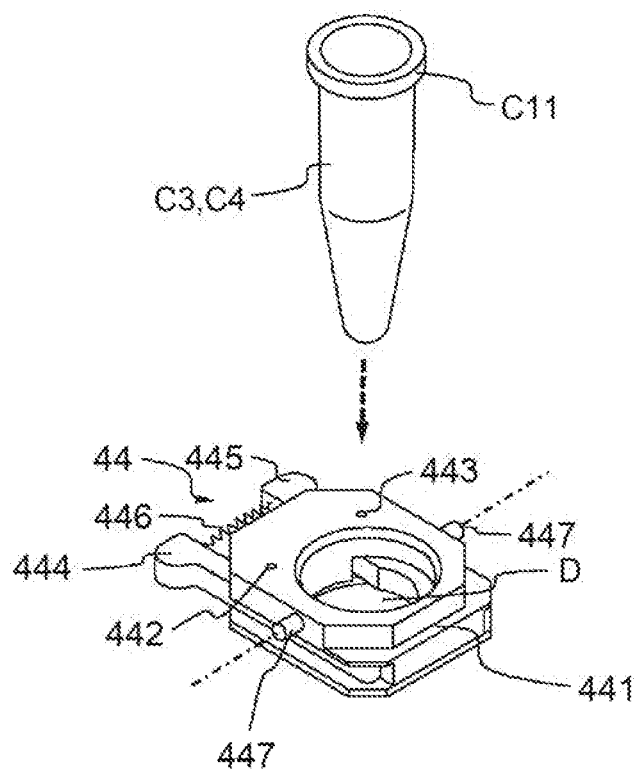
FIG. 5 is a perspective view illustrating an exemplary tube holding part.

FIG. 5 is a perspective view illustrating an example of the tube holding part 44. As illustrated in FIG. 5, the tube holding part 44 has a holder 441 into which a centrifugal tube C3 or a magnetic bead tube C4 is inserted, two holding knob rotation shafts 442 and 443, two holding knobs 444 and 445 each rotatable about one of the rotation shafts, and an elastic part 446 connecting between the two holding knobs. A shafts 447 is provided at the holder 441 installed in the centrifugal separator 47, and the tube holding part 44 is rotatable about the shafts 447. A direction of the shaft 447 is substantially parallel to a rotation direction of the centrifugal separator 47 and is perpendicular to a radial direction of the centrifugal separator 47. The elastic part 446 may foe a spring, rubber or the like.

a hole D for inserting a tube is formed in the holder 441, and two holding knobs 444 and 445 are provided at a lower part of the holder 441. The two holding knobs 444 and 445 are installed to two holding knob rotation shafts 442 and 443 respectively (installed to the holder 441) and rotated about the holding knob rotation shafts 442 and 443 respectively. The two holding knobs 444 and 445 are connected by the elastic part 446, and the elastic part 446 energizes the respective holding knobs to rotate in the opposite direction.

That is, the elastic part 446 energizes the two holding knobs away from each other. As a result, sides of the two holding knobs 444 and 445 for holding a tube approach to clamp and hold the tube. Of the holding knob, a part of the knob on a side where the elastic part 446 is located may be referred to as a knob part while a side for holding a tube may be referred to as a holding part.

Figure 6:
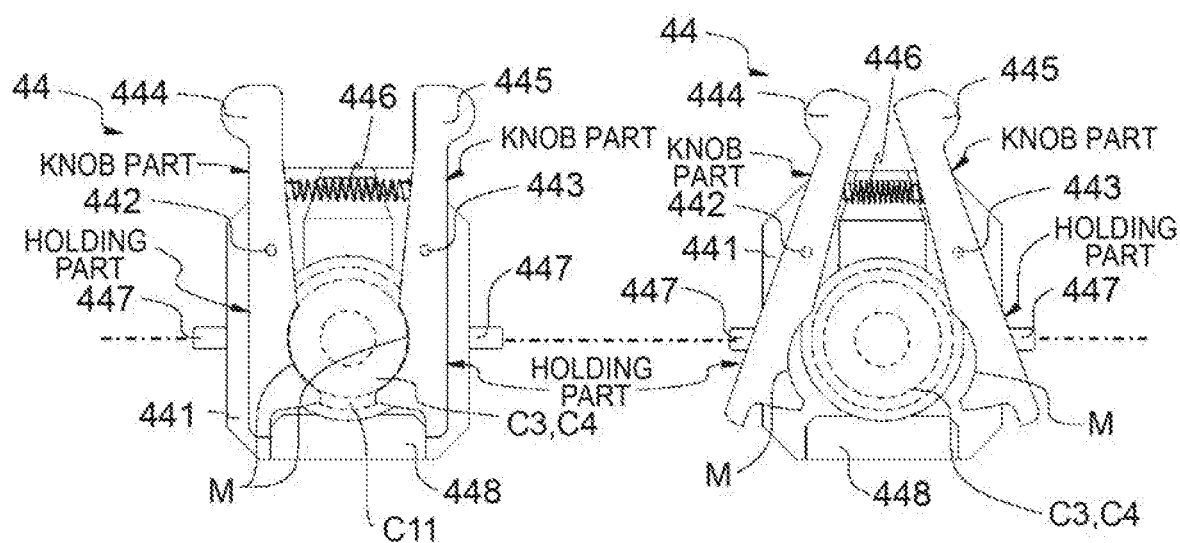
FIG. 6 is diagrams illustrating an example of opening and closing operations of the tube holding part.

FIG. 6 is a diagram illustrating an example of opening and closing operations of the tube holding part 44. The left side of FIG. 6 is a diagram illustrating a closing operation of the tubes holding part 44. In the closing operation as illustrated in the left side of FIG. 6, a tube indicated by a broken line is clamped and held by the two holding knobs. The elastic part 446 is arranged so that the holding knob rotation shafts 442 and 443 are located between the elastic part 446 and the tube. An arc-shaped groove M is provided at the two holding knobs in accordance with the shape of a tube to allow the tube to be stably held. It is preferable that an outer peripheral part C11 of the tube having a larger diameter than the groove M is held so as to be placed on the holding part. Furthermore, in order to secure the diameter of the hole D in a state where a tube is not inserted, the closing operation of the opposite side of the knob part of the tube holding part is restricted by a projecting part 448 provided at the holder 441. When holding a tube, the grooves M in contact with the tube are located inside a space between the two holding knob rotation shafts 442 and 443. When centrifugal force acts on the tube, the force received by the holding knob from the tube acts as a moment about the holding knob rotation Since a direction of this moment is a direction to close the holding knobs, a centrifugal tube can foe held more reliably.

The right side of FIG. 6 is a diagram illustrating an opening operation of the tube holding part 44. As illustrated in the right side of FIG. 6, when the two holding knobs 444 and 445 are energized in a direction to shrink the elastic part 446, the holding knobs clamping the tube are opened, and the tube is dropped down-ward from the holder. In order to bring the two holding knobs into the state in the right side of FIG. 6, a holding knob operation part 7 is used. The holding knob operation part 7 will be described later.

Each of the tube holding parts 44 installed at the centrifugal separator 47 is arranged so that two holding knobs face toward the socket ring 45 which is outside the centrifugal separator 47. Furthermore, each of the tube holding parts 44 installed at the socket ring 45 is arranged so that two holding knobs face toward the centrifugal separator 47 which is inside the socket ring. That is, the tube holding parts 44 arranged at each of the centrifugal separator 47 and the socket ring 45 are arranged so that holding knobs face each other.

Figure 7:
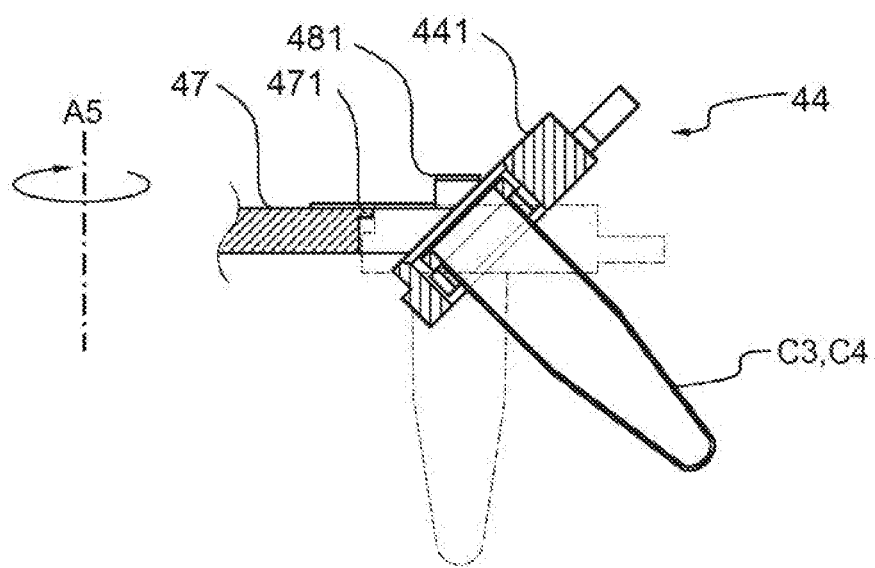
FIG. 7 is a cross-sectional view illustrating an exemplary tube held by the tube holding part while a centrifugal separator is rotating.

FIG. 7 is a cross-sectional view illustrating an example of the centrifugal tube C3 held by the tube holding part 44 while the centrifugal separator 47 is rotating.

As illustrated in FIG. 7, when the centrifugal separator 47 is rotating, centrifugal force is generated at the centrifugal tube C3 and the tube holding part 44. A direction of the centrifugal force is generated at an outer side of the radial direction of the centrifugal separator 47. In order to prevent an influence of the centrifugal force, the tube holding part 44 of the present embodiment is rotatable about the shafts 447 provided at the holder 441. As illustrated in FIG. 7, when centrifugal force is generated at the centrifugal tube C3, the centrifugal tube C3 and the tube holding part 44 rotate about the shafts 447 and incline so that the opening of the centrifugal tube C3 faces the direction of the rotation axis (fifth rotation axis) A5 of the centrifugal separator 47. As a result, a lower end of the centrifugal tube C3 inclines and faces outward, and the specimen in the centrifugal tube is prevented from jumping out of the centrifugal tube due to the centrifugal force. Furthermore, since the holder 441 touches a protrusion 481 of the tube holding stopper 48 provided at an upper surface of the centrifugal separator 47, the inclination of the tube holding part 44 and the centrifugal tube C3 is limited to be a predetermined angle or less. When the centrifugal separator 47 stops and the (inclined) tube holding part 44 returns to the horizontal position, a protrusion 471 of the centrifugal separator 47 touches the tube holding part 44, thereby limiting an inclination of the tube holding part 44 and the centrifugal tube C3 to be a predetermined angle or less. When the centrifugal tube C3 is removed from the tube holding part 44, the first holding mechanism 29 of the tube arm 2 approaches from above the centrifugal tube C3, holds the centrifugal tube C3 and pulls it upward. At this time, in order to prevent the tube holding part 44 from rotating about the shafts 447, the first holding mechanism 29 preferably includes a regulating part (not illustrated) or other parts for preventing rotation of the tube holding part 44. The tube holding part 44 is not limited to the configuration described above. Any configuration may be employed as long as a tube can be fixed to such an extent that the tube does not come off during rotation of the centrifugal separator 47.

The magnetic separator 5 applies a magnetic field to a specimen in the magnetic bead tube C4 containing magnetic beads to allow the magnetic beads to gather in a direction of the magnetic field together with unnecessary substances in the specimen. The specimen solution remaining separated from the magnetic beads is sucked by using the chip T mounted to the pipettor's nozzle 39. The magnetic separator 5 is arranged in the vicinity of the magnetic bead tube C4 installed in the tube holding part 44 of the socket ring 45 (see FIG. 2). For example, it is preferable that the magnetic separator 5 is arranged below the magnetic bead tube C4. By applying a magnetic field from below the magnetic bead tube C4 by the magnetic separator, the magnetic beads gather into a lower part of the tube and the specimen solution from which the unnecessary substances are eliminated remains in an upper part of the tube. Therefore, it is easy to suck the specimen solution by the pipettor. The magnetic separator 5 may be a permanent magnet, a hollow solenoid type electromagnet or the like.

The stirrer 6 stirs the magnetic beads and the injected specimen in the magnetic bead tube C4. By stirring the magnetic beads and the specimen solution, unnecessary substances in the specimen solution are misted with the magnetic beads to allow unnecessary substances to be efficiently taken into the magnetic beads when a magnetic field is applied. The stirrer 6 is arranged at a position where vibration can be applied to the magnetic bead tube C4 (see FIG. 2). Furthermore, the stirrer 6 is preferably arranged in the vicinity of the magnetic separator 5. The stirrer 6 may be a shaker, a vibrator or the like.

Figure 8:
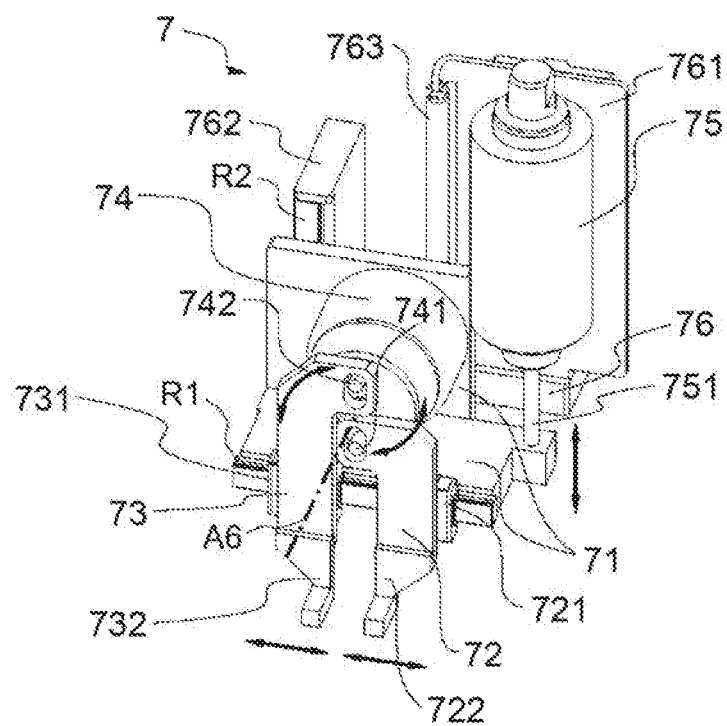
FIG. 8 is a schematic diagram illustrating an exemplary holding knob operation part.

FIG. 8 is a schematic diagram illustrating an example of the holding knob operation part 7. As illustrated in FIG. 8, the holding knob operation part 7 includes a holding mechanism base 71, a first holding link 72, a second holding link 73, a rotary solenoid 74, a translation solenoid 75, and a support column 76.

The holding knob operation part 7 is positioned above the tube holding parts 44 of the centrifugal separator 47 and of the socket ring 45 of the rotary tube socket 4.

The L-shaped holding mechanism base 71 formed by two surfaces, a vertical surface and a horizontal surface, has the rotary solenoid 74 on the vertical surface and a first rail R1 on the horizontal surface. The first rail R1 is connected to the first holding link guide 721 of the first holding link 72 and guides the first holding link 72 in the horizontal direction. Furthermore, the first rail R1 is connected to the second holding link guide 731 of the second holding link 73 and guides the second holding link 73 in the horizontal direction.

A first holding arm 722 is provided at a tip of the first holding link 72. A second holding arm 732 is provided at a tip of the second holding link 73.

A first positioning part 741 and a second positioning part 742 are provided at the rotary solenoid 74. The first positioning part 741 is attached to an elliptical hole formed at a base end of the first holding link 72, and the second positioning part 742 is attached to an elliptical hole formed at a base end of the second holding link 73. The first holding link 72 and the second holding link 73 are attached in the vertical direction. As illustrated in FIG. 8, the first positioning part 741 and the second positioning part 742 are aligned in the vertical direction with the holding arms in a closed state. The "closed" of the holding arms is a state where a distance between the first holding arm 722 and the second holding arm 732 is the closest and an object is held. On the other hand, an "opened state" of the holding arms is a state where a distance between the first holding arm 722 and the second holding arm 732 is apart and the object is not held. The rotary solenoid 74 can be driven clockwise (CW) and counterclockwise (CCW) about a sixth rotation axis A6. In the case of FIG. 8, when the rotary solenoid 74 is driven in the CCW direction, the first holding link 72 and the second holding link 73 move away from each other. That is, the holding arms are in the opened state. When the rotary solenoid is driven in the CW direction from this the first holding link 72 and the second holding link 73 move closer to each other. That is, the holding arms are in the closed state. The holding knob operation part 7 clamps each knob part of the holding knobs 444 and 445 of the tube holding part 44 by opening and closing operations of the first holding link 72 and the second holding link 73.

The translation solenoid 75 is supported by a support plate 761 fixed to the support column 76. The translation solenoid 75 has a function of changing the height of the holding mechanism base 71 by being vertically driven in the height direction. That is, the height of the first holding link 72 and the second holding link 73 is changed. The holding mechanism base 71 is connected to one end of a tension spring 763 of which the other end is connected to the support plate 761. The holding mechanism base 71 descends by being pushed downward by a pushing in-pushing out rod 751 of the translation solenoid 75 and ascends by being pulled back by the pushing in-pushing out rod 751 and restoring force of the tension spring 763. A support block 762 fixed to the support column 76 is provided with a second rail R2 that guides the holding mechanism base 71 in the vertical direction and is connected to a link guide (not illustrated) provided to the holding mechanism base 71. In accordance with driving of the translation solenoid 75, the holding mechanism base 71 moves in the vertical direction along the second rail R2.

The first holding link 72 and the second holding link 73 are driven up and down by the translation solenoid 75, and further driven in a lateral direction by the rotary solenoid 74 to open and close the first holding arm 722 and the second holding arm 732. Upon disposal of a tube, the holding knob operation part 7 lowers the holding arms to the height of a tube holding part in a state where the first holding arm 722 and the second holding arm 732 are open. Then, by closing the first holding arm 722 and the second holding arm 732, and by opening the holding parts of the holding knobs 444 and 445 of the tube holding part as in the right side of FIG. 6, the tube is dropped.

It is preferable that the tips of the first holding arm 722 and the second holding arm 732 are formed in an L shape so as to simultaneously clamp the knob parts of the holding knobs 444 and 445 that are arranged to face in the radial direction of the centrifugal separator 47 and the socket ring 45. By simultaneously disposing tubes on the centrifugal separator 47 and the socket ring 45, it is possible to perform disposing operation in half the time when disposing of them individually. Furthermore, by arranging the tube holding parts 44 of the centrifugal separator 47 at positions not aligned with the tube holding parts 44 of the socket ring 45 in the radial direction, only tubes on the socket ring 45 can be selectively disposed.

The support column 76 is fixed on an outer edge of the tube socket base 41. Alternatively, it may be fixed on the intermediate base.

The holding knob operation part 7 is connected to a control device 16, whereby driving of the rotary solenoid 74 and the translation solenoid 75 is controlled.

Although the holding knob operation part 7 has been described to open and close the holding arms using the rotary solenoid 74, the holding arms may be opened and closed using a simple configuration such as a motor.

The dispensing arm 8 has a dispensing nozzle 81 and discharges a buffer solution from the dispensing nozzle 81. The dispensing arm 8 is installed on the tube socket base 41.

As illustrated in FIG. 2, the dispensing nozzle 81 at a tip of the dispensing arm 8 is positioned above one of the tube holding parts 44 installed on an outer peripheral part of the centrifugal separator 47. The dispensing nozzle 81 discharges a buffer solution from above a specimen in a centrifugal tube held by the tube holding part 44. The dispensing nozzle 81 is connected to a buffer solution tank via a buffer solution pump, which will be described later. By controlling the pressure of the buffer solution pump, the amount of buffer solution discharged into the centrifugal tube is controlled.

The disposal part 9 is a part for disposing of the chip T mounted to a tip of the pipettor's nozzle 39 of the pipettor arm 3, and the centrifugal tube C3 or the magnetic bead tube C4 held by the tube holding part 44 of the rotary tube socket 4. The disposal part 9 of the processing area is connected to the disposal area.

As illustrated in FIGS. 1 and 2, the disposal part 9 has a first disposal port 91 for disposing of chips and a second disposal port 92 for disposing of tubes. The first disposal port 91 also includes a liquid waste port 93 for disposing of excessive specimen (solution) remaining in the chip.

As illustrated in FIG. 2, the first disposal port 91 is provided at a position within a movable range of the pipettor arm. The position is other than those where the rotary tube socket is arranged.

Figure 9:
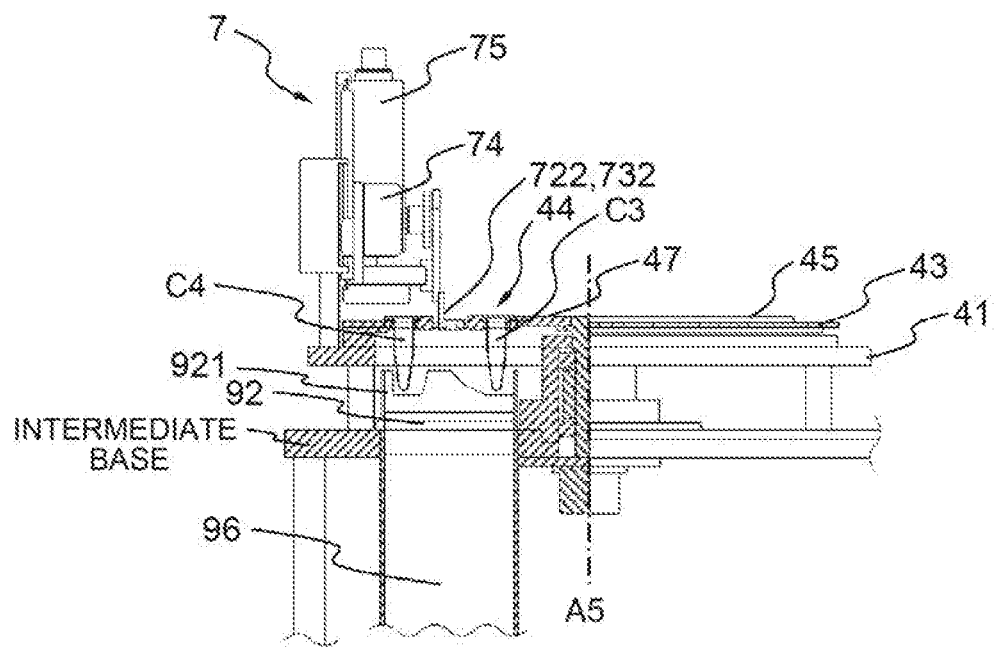
FIG. 9 is a cross-sectional view illustrating an exemplary cross section of a Y line segment in FIG. 4 when viewed from an X direction.

FIG. 9 is a cross-sectional view illustrating an exemplary cross section taken along a line segment Y in FIG. 4 when viewed from an X direction. As illustrated in FIG. 4 and 9, the second disposal port 92 is provided below the holding knob operation part 7. The second disposal port 92 has an opening with the width that allows, when the magnetic bead tube C4 installed in the tube holding part 44 of the socket ring 45 and the centrifugal tube C3 installed in the tube holding part 44 of the centrifugal separator 47 are aligned in the radial direction of rotation, the two tubes to drop vertically downward. In the second disposal port 92, a disposal guide 921 is provided between the intermediate base and the tube socket base 41, thereby reliably guiding a disposed tube to the disposal port 92. The disposal guide 921 is provided with a notch to allow the centrifugal tube C3 and the magnetic bead tube C4 to pass in a rotating manner. The port 91 and the second disposal port 92 are connected to a liquid waste pipe or a disposal duct in the disposal area with a hole formed in the intermediate base.

The recognition device 10 recognizes the position of a specimen or the like in the centrifugal tube C3. As illustrated in FIG. 2, the recognition device 10 is arranged outside the rotary tube socket 4, and recognizes the specimen or the like inside the tube from a side surface direction. The recognition device 10 allows for recognizing the specimen or the like inside a tube installed in the tube holding part 44 of the socket ring 45 and the centrifugal separator 47. By recognizing the position of the specimen or the like by the recognition device 10, the pipettor's nozzle 39 accurately sucks a specimen in the centrifugal tube C3, for example.

The recognition device 10 is connected to the control device 16, which will be described later. A recognition result recognized by the recognition device 10 is analyzed by the control device 16. Then, among specimens whose components have been separated by a predetermined method, position information of the specimen including a boundary surface shape among respective components is derived. The position information of the specimen is used for driving control of the pipettor arm 3 when the pipettor's nozzle 39 sucks the specimen.

The recognition device 10 includes an optical system such as a camera, and an imaging device such as a charge coupled device (CCD) sensor or a complementary metal oxide semiconductor (CMOS) sensor. Also, a camera capable of measuring a three-dimensional position such as an infrared dot pattern projection type camera can be used. When the tube is within a range (recognition range) indicated by an alternate long and short dashed line in FIG. 2 with respect to a focal point of the camera or an illumination condition, an interior of the tube can be precisely recognized. Since a recognized image is used as a target of positional control of the tip of the pipettor's nozzle, this recognition range is preferably set within an operation range of the pipettor arm. The recognition device 10 is formed by one camera, but is not limited thereto.

A recognition result is image data including distance information of a specimen or the like in the tube, for example. The image data may be commonly used data such as jpg, gif, png, bmp, and the like.

Here, a method for recognizing a specimen position of the inspection apparatus 1 according to the present embodiment will be described. In the present embodiment, the method is capable of desirably changing a direction of a tube by combining a degree of freedom of each link of the tube arm 2 and a degree of freedom of rotation of the tube holding part 44 installed in the rotary tube socket 4.

Figure 10:
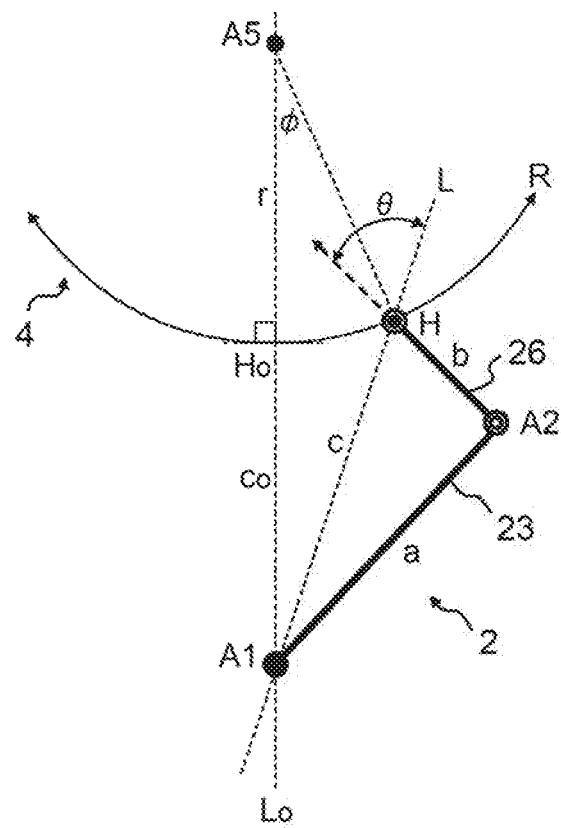
FIG. 10 is a simplified diagram of a rotary tube socket and a tube arm.

FIG. 10 is a simplified diagram of the rotary tube socket 4 and the tube arm 2.

As illustrated in FIG. 10, a point A5 is the fifth rotation axis A5 of the rotary tube socket 4 and an arc R indicates the center of a tube conveyed by the rotary tube socket 4, that is, the position and trajectory of the tube holding part 44. This arc R (also referred to as a trajectory R) may be a trajectory of the tube holding part installed in the centrifugal separator or a trajectory of the tube holding part installed in the socket ring. A point A1 is a first rotation axis A1 of the first link 23, and a point A2 is a second rotation axis A2 of the second link 26. A point H is a position for holding the tube of the first holding mechanism 29 at the tip of the second link 26. A linear line $L_0$ connects the point A5 and the point A1, and the linear line L connects the point H and the point A1. The point $H_0$ is an intersecting point of the linear line $L_0$ and the trajectory R. r indicates a distance (radius) from the point A5 to the trajectory R. $c_0$ indicates a length from the point $S_0$ to the point A1 (shortest distance from the point A1 to the trajectory R). a is a length from the point A1 to the point A2 (that is, the length of the first link), and b is a length from the point A2 to the point H (that is, the length of the second link). c is a distance from the point A1 to the point H. φ is an angle formed by a line segment connecting the point A5 and the point H, and the linear line $L_0$. θ is an angle formed by the linear line L and a line segment connecting the point H and the point A2. The point H is a position where the first holding mechanism 29 of the tube arm 2 holds the tube. Since this corresponds to the state in which the tube holding part 44 holds the tube, it is assumed that the point H always exists on the trajectory R in the following description.

Figure 11:
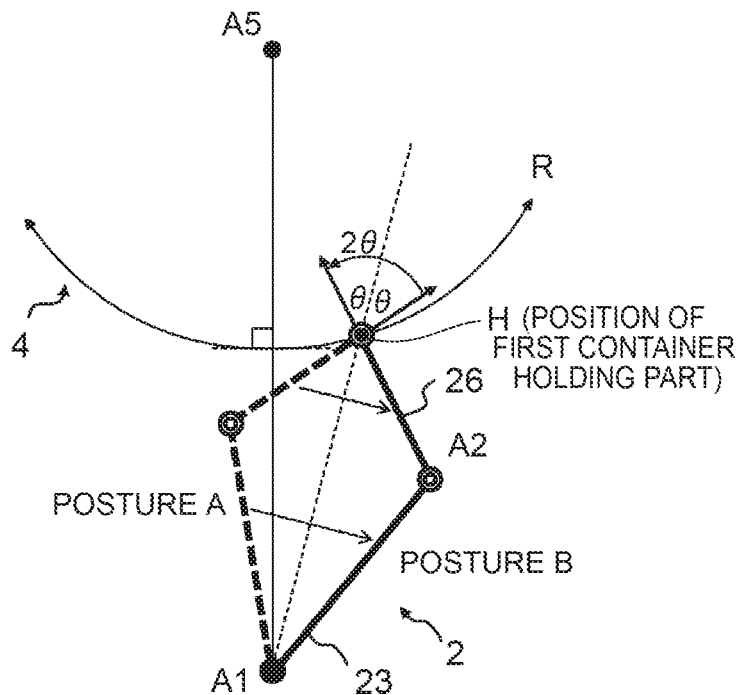
FIG. 11 is a diagram illustrating a posture of the tube arm when a tube is installed in one tube holding part.

FIG. 11 is a diagram illustrating the posture of the tube arm when installing a tube into one of the tube holding parts.

As illustrated in FIG. 11, when a two-link arm mechanism is adopted for the tube arm 2, the posture of installing the tube in one of the tube holding parts 44 has two cases. These are a posture A (also referred to as a first posture) in which the second link 26 is folded rightward with respect to the first link 23, and a posture B (also referred to as a second posture) in which the second link 26 is folded leftward with respect to the first link 23. Here, a posture refers to positions and states of the first link 23, the second link 26 and the first holding mechanism 29 when the tube arm 2 installs or reinstalls a tube into the tube holding part 44. In other words, the posture indicates positions and states of the first rotation axis A1 and the second rotation axis A2 of the tube arm 2 and a tube holding position of the first holding mechanism 29. As described above, when the tube arm 2 installs or reinstalls a tube into the tube holding part 44, the tube holding part 44 and a tube holding position of the first holding mechanism 29 coincide. Therefore, the posture can also be referred to as positions and states of the first rotation axis A1, the second rotation axis A2 and the tube holding part 44. Here, reinstallation refers to, for example, holding a tube, which has been installed into the tube holding part 44 by the tube arm 2 in the first posture, by the tube arm 2 again in the first posture, thereby removing the tube from the tube holding part 44, and reinstalling the tube to the tube holding part 44 after changing to the second posture. A tube holding part to be reinstalled is not limited to the tube holding part (this holding part can be a "first container holding part") having been installed in the first posture but may be another tube holding part (this holding part can be a "second container holding part").

For example, after holding the tube installed into the tube holding part 44 in the first posture and removing it, by reinstalling the tube into the tube holding part 44 in the second posture without releasing and holding again the tube, a rotation direction of the tube on the rotary tube socket is changed by 2θ. That is, first installing the tube into the tube holding part 44 in the first posture and then reinstalling the tube into the tube holding part in the second posture allow the tube to rotate by 2θ in the CCW direction. Also, first installing the tube into the tube holding part 44 in the second posture and then reinstalling the tube into the tube holding part in the first posture allow the tube to rotate by 2θ in the CW direction. As a result, when the recognition device 10 recognizes a specimen or the like inside the tube from a side surface, it is possible to recognize it by changing a direction of the specimen in the tube by 2θ (this recognition result can be a "second recognition result"). Here, θ is expressed by the following mathematical formula (1).

$$\cos\theta = \frac{b^2 + c^2 - a^2}{2bc} \quad (1)$$

Basically, a, b and r are fixed in the inspection apparatus, however, c varies with φ. The angle φ is expressed by the following mathematical formula (2).

$$\cos\phi = \frac{r^2 + (r - c_0)^2 - c^2}{2r(r + c_0)} \quad (2)$$

Figure 12A:
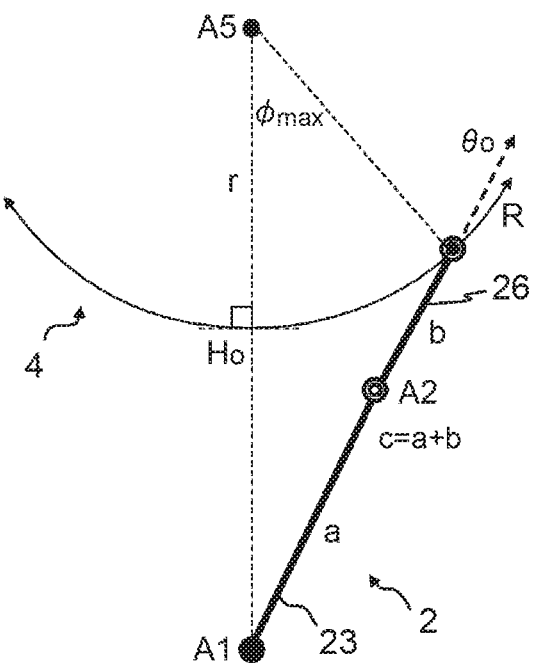
FIGS. 12A and 12B are diagrams illustrating postures of the first link and the second link in a case where ϕ is maximum and when ϕ is minimum.
Figure 12B:
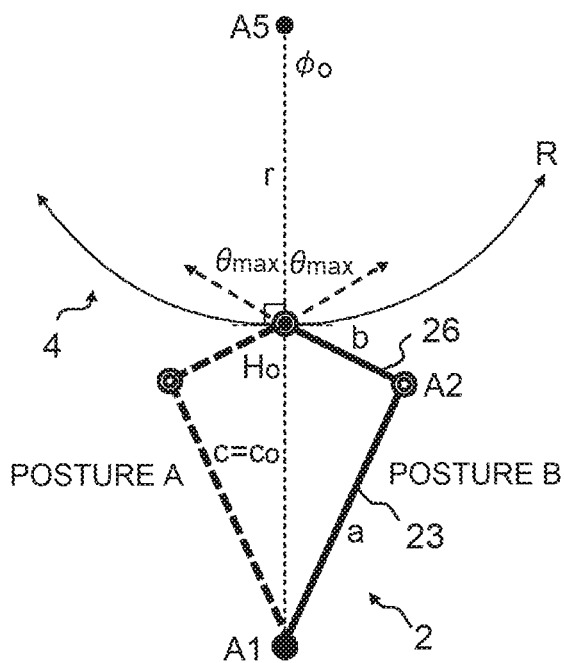

FIGS. 12A and 12B are diagrams illustrating postures of the first link and the second link when φ is the maximum (referred to as $\phi_{max}$) and φ is the minimum (referred to as $\phi_0$).

As illustrated in FIG. 12A, the minimum value of θ (referred to as $\theta_0$) is the case where the sum of a and b is equal to c. That is, the case where the first link 23 and the second link 26 form a linear line with a value of θ being 0. When θ is 0, $\phi_{max}$ is obtained. In this case, even if the tube is reinstalled, a direction of rotation does not change. A value $\phi_{max}$ is calculated by replacing the square of c in the mathematical formula (2) with the square of the sum of a and b. This means that a tube at a position having a value larger than $\phi_{max}$ cannot be held.

As illustrated in FIG. 12B, the maximum value of θ (referred to as $\theta_{max}$) is obtained as the minimum value $c_0$ of c. This is the case where H is equal to $H_0$. That is, φ is obtained as $\phi_0$ which is 0.

From $\phi_0$ to $\phi_{max}$, the value continuously varies as long not limited by the rotation resolution of the rotary tube socket 4, and θ also continuously varies (unless a posture is reversed). Therefore, if a desired θ is to be obtained, it is only required to derive φ which is calculated back from the mathematical formulas (1) and (2), and to install and reinstall the tube at that position. Deriving desired θ and other operations by using the mathematical formulas (1) and (2) are performed by a control device, which will be described later.

In the case where the recognition device 10 is installed in the vicinity of φ position different from a position where installation and reinstallation are performed, every time the installation and reinstallation are performed, conveyance by the rotary tube socket is also performed. For example, when it is desired to obtain the rotation amount ($\theta_x$) of the tube other than $\theta_{max}$ when the recognition device 10 recognizes a specimen in the tube from the outside (or inside) of the $\phi_0$ position of the trajectory R, the tube is conveyed by the rotary tube socket 4 to φ where $\theta_x$ is obtained, where the tube is installed and reinstalled. Then again the tube is returned to the position of $\phi_0$ by the rotary tube socket 4.

Actually, it is often desired that recognition is performed from a plurality of directions since an appropriate rotation angle θ is unclear. In such a case, for example, fey obtaining a position of φ from good θ (e.g. 45, 30 or 15 degrees) in advance, and by installing and reinstalling the tube at each of the derived positions, the tube can be recognized from a plurality of directions (in this regard, it is also possible to set a numerical value such as $c_0$ such that a desired angle θ is obtained at $\phi_0$). In order to skip transfer of the rotary tube socket 4, it is preferable that the recognition device 10 is installed at a specified position. Furthermore, in the method for changing a direction of a tube of the present embodiment, it is assumed that the tube does not rotate while the tube arm 2 holds the tube. Therefore, it is preferable that the first holding mechanism 29 of the tube arm 2 firmly holds the tube.

The recognition results obtained by recognizing the tube installed in the first posture and the second posture described above by the recognition device 10 is processed as position information of the specimen in the tube by the control device 16, which will be described later. The control device 16 controls driving of the pipettor arm 3 or driving of the rotary tube socket 4 on the basis of the position information of the specimen. For example, by driving the pipettor arm 3 from the position information of the specimen in the tube, the specimen is sucked into a chip accurately. When the position information of the specimen is insufficient in the recognition result, the centrifugal separator 47 of the rotary tube socket 4 are rotated to control the tubs holding part 44 to be moved to a predetermined position in order to change a rotation angle $\theta$ of the tube. Alternatively, the control may be performed to derive the second posture of the tube arm 2 on the basis of the recognition result of the first posture. Driving control of the tube arm 2, the pipettor arm 3, and the rotary tube socket 4 in the control device 16 can be performed in various combinations.

Next, the disposal area will be described in detail. The disposal area is provided on a lower layer of the intermediate base. The disposal area is a place where chips, tubes, specimen solutions or the like fed from the disposal part 9 are collected. As illustrated in FIGS. 1 and 2, the disposal provided with a liquid waste pipe 94 connected to the liquid waste port 93, a first disposal duct 95 connected to the first disposal port 91, a second disposal duct 96 connected to the second disposal port 92, a liquid waste tank 97 for storing liquid waste having passed through the liquid waste pipe 94, and a collection box 98 for storing chips, tubes and the like having passed through the first disposal duct 95 and the second disposal duct 96. A disposal gate G5 for connecting the disposal and the outside of the apparatus is further provided. An operator takes out the liquid waste tank 37 or the collection box 98 in which the wastes are collected in the disposal area from the disposal gate G5. Opening and closing of the disposal gate G5 can be operated by the operation panel P provided outside the apparatus.

Next, the control area will be described in detail. The control area is provided on a lower area of the intermediate base. The control area is a place where conveyance of the first to fourth cartridges, opening and closing of the first to fourth gates, control of the pipettor arm 3, the tube arm 2, the rotary tube socket 4 and the holding knob operation part 7 in the processing area, pressure control of the pipettor arm 3 and other control are performed.

As illustrated in FIG. 1, the control area is provided with the liquid transporting part 15 and the control device 16.

Figure 13:
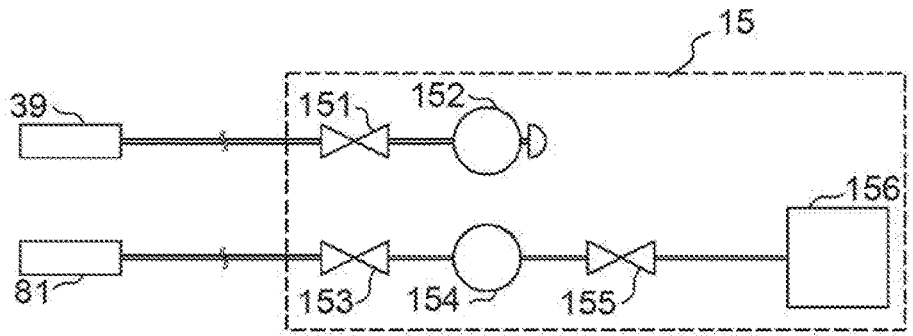
FIG. 13 is a block diagram illustrating an exemplary liquid transporting part.

FIG. 13 is block diagram illustrating an exemplary liquid transporting part 15. As illustrated in FIG. 13, the liquid transporting part 15 is provided with a first electromagnetic valve 151, a cylinder pump 152 for pipettor connected to the first electromagnetic valve 151, a second electromagnetic valve 153, a buffer solution pump 154 connected to the second electromagnetic valve 153, a third electromagnetic valve 155 connected to the buffer solution pump 154, and a buffer solution tank 156 connected to the third electromagnetic valve 155. The first electromagnetic valve 151 is connected to the pipettor's nozzle 39, and the second electromagnetic valve 153 is connected to the dispensing nozzle 81.

The pipettor's nozzle 39 installed in the pipettor arm 3 is connected to the cylinder pump 152 for pipettor via a flexible pipe and the first electromagnetic valve 151. By combined operations of the first electromagnetic valve 151 and the cylinder pump 152 for pipettor, a specimen solution is sucked and discharged via a chip T mounted to the pipettor's nozzle 39.

The dispensing nozzle 81 installed in the dispensing arm 8 is connected to the buffer solution pump 154 via a flexible pipe and the second electromagnetic valve 153, and the buffer solution pump 154 is connected to the buffer solution tank 156 via a flexible pipe and the third electromagnetic valve 155. By combined operations of the second electromagnetic valve 153, the third electromagnetic valve 155 and the buffer solution pump 154, a buffer solution in the buffer solution tank 156 can be discharged from the dispensing nozzle 81.

Figure 14:
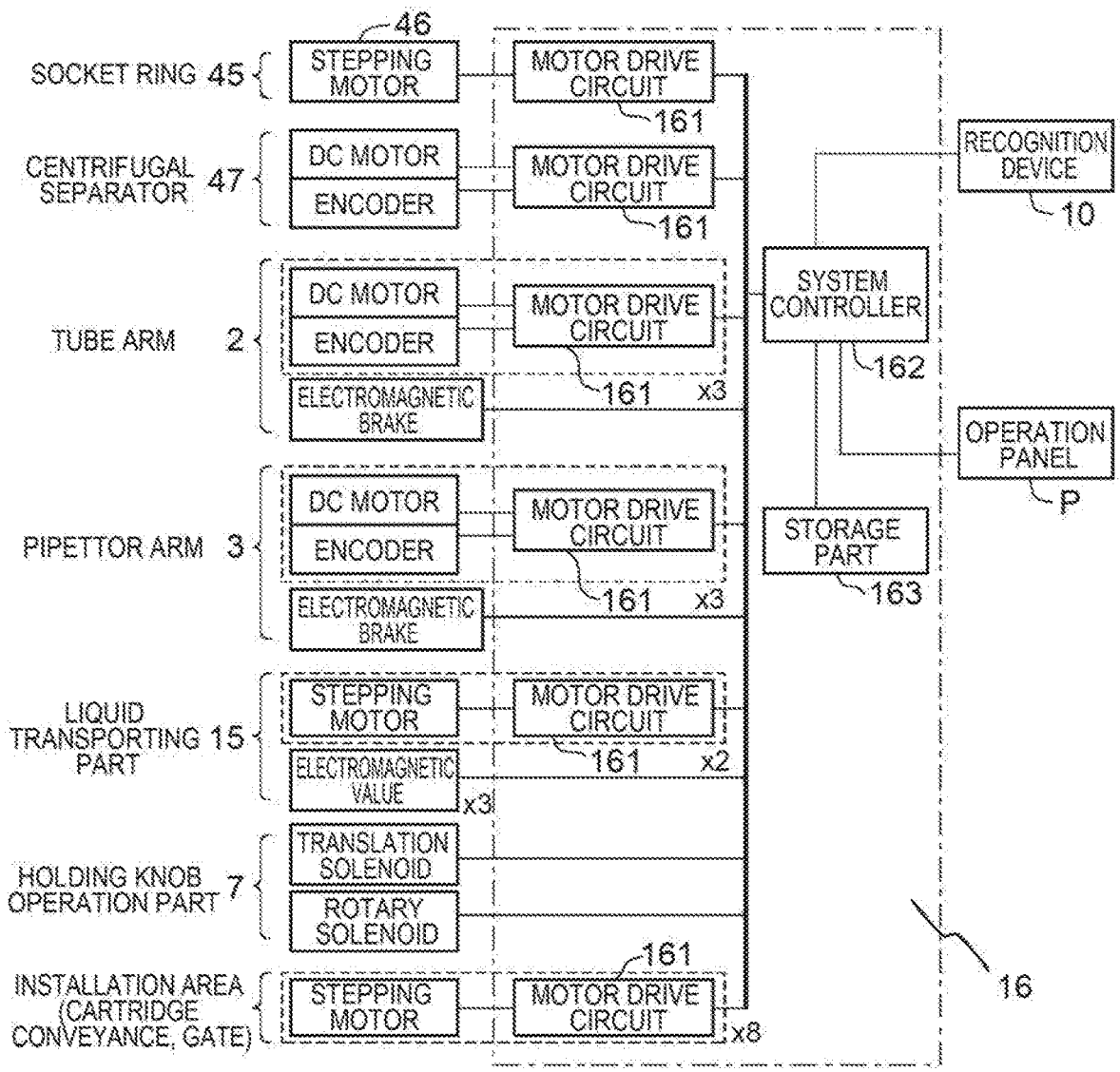
FIG. 14 is a block diagram illustrating an exemplary control device.

FIG. 14 is a block diagram illustrating an example of the control device 16. As illustrated in FIG. 14, the control device 16 includes motor drive circuits 161 each of which drives the socket ring 45, the centrifugal separator 47, the tube arm 2, the pipettor arm 3, the liquid transporting part 15, the first to fourth cartridges 11~14 and the first to fourth gates G1-G4 and conveying gates, a system controller 162 transmitting a command signal to the motor drive circuits 161 and the recognition device 10, and a storage part 163 storing a driving flow, a driving log and the like.

The fifth motor 46 for rotating the socket ring 45 is controlled to have a desired target angle on the basis of a command signal transmitted from the system controller 162 by a motor drive circuit 161 provided in the control device 16. The sixth motor for rotating the centrifugal separator 47 is controlled to have a target angular velocity and a target angle on the basis of a sixth encoder signal and the command signal transmitted from the system controller 162 by the motor drive circuit 161 provided in the control device 16.

The first motor 24 and the second motor 27 for driving the respective links of the tube arm 2, and the linear motion motor for driving the first linear motion mechanism 22 are controlled by the motor drive circuit 161 connected thereto respectively, and is controlled to a desired target angle on the basis of an encoder signal of each of the motors and a command signal transmitted from the system controller 162. Furthermore, by an electromagnetic brake installed in the first linear motion mechanism 22, during operation, the electromagnetic brake is released to allow the first linear motion mechanism 22 to operate. When a power source is blocked, the electromagnetic brake functions to prevent the first linear motion mechanism 22 from descending by the weight of the tube arm. The third motor 34 and the fourth motor 37 for driving the respective links of the pipettor arm 3, and the linear motion motor for driving the second linear motion mechanism 32 are controlled by the motor drive circuit 161 connected thereto respectively, and is controlled to have a desired target angle on the basis of an encoder signal of each of the motors and the command signal transmitted from the system controller 162. Furthermore, by the electromagnetic brake installed in the second linear motion mechanism, during operation, the electromagnetic brake is released to allow the second linear motion mechanism 32 to operate. When a power source is blocked, the electromagnetic brake functions to prevent the second linear motion mechanism 32 from descending by the weight of the tube arm.

Each of the cylinder pump 152 for pipettor and the buffer solution pump 154 provided in the liquid transporting part 15 adjuss sucking/discharging amount by a cylinder driven by the stepping motor. A command signal of each of the electromagnetic valves is transmitted from the system controller 162.

The translation solenoid 75 and the rotary solenoid 74 provided in the holding knob operation part 7 operate in accordance with a command signal from the system, controller 162.

Drive circuits for controlling the stepping motors for driving the first to fourth cartridges and the first to fourth gates and conveying gates are also provided in the control device.

In addition, the system controller 162 performs screen generation of the operation panel P for an operator to input/output information therewith and acquisition of input information therefrom. The system controller 162 transmits a command signal to an electric component such as a motor drive circuit or a solenoid on the basis of input information input to the operation panel, for example.

The operation panel P may employ a method for inputting from a monitor of a computer or other devices, or may be a touch panel or the like.

The recognition device 10 recognizes a specimen or the like in a tube, and transfers the recognition result to the system controller 162. The system controller 162 controls driving of the tube arm 2, the pipettor arm 3, the socket ring 45 and the centrifugal separator 47 on the basis of the recognition result. The system controller 162 may transmit a command signal for generating a recognition result to the recognition device 10 by sensing that a tube is installed or reinstalled into the tube holding part 44 by a sensor. Furthermore, the system controller 162 may cause the recognition device 10 to constantly recognize a position of a specimen or the like in the tube when the tube arm 2 installs and reinstalls the tube, and to transmit a command signal for generating the recognition result. In this case, position information of the specimen can be acquired within a range of the rotation angle θ of the tube. Furthermore, the system controller 162 may derive a required rotation angle of the tube for recognizing the specimen inside the tube by the recognition device 10 on the basis of position information of the respective links of the tube arm 2 and the first holding mechanism, position information of the tube installed in the rotary tube socket 4, a rotation amount of the centrifugal separator 47 and the socket ring 45 of the rotary tube socket 4.

The system controller 162 corresponds to a digital signal processor (DSP) or a central processing unit (CPU) and calculates sensor data or encoder data to generate a command signal.

The storage part 163 stores data such as an operation processing flow, an operation program and an operation log, and is capable of reading as appropriate depending on a situation. The storage part 163 also stores length information of the respective links of the tube arm 2 or the pipettor arm 3, information of the respective motors and other information. The storage part 163 may be a tape type such as a magnetic tape or a cassette tape, a magnetic disk such as a floppy (registered trademark) disk/a hard disk, a disk type including an optical disk such as a CD-ROM/MO/MD/DVD/CDR, a card type such as an IC card (including a memory card)/an optical card, or a semiconductor memory type such as a mask ROM/EPROM/EEPROM/flash ROM.

Next, exemplary operation of the inspection apparatus 1 according to the present embodiment will be described.

Figure 15:
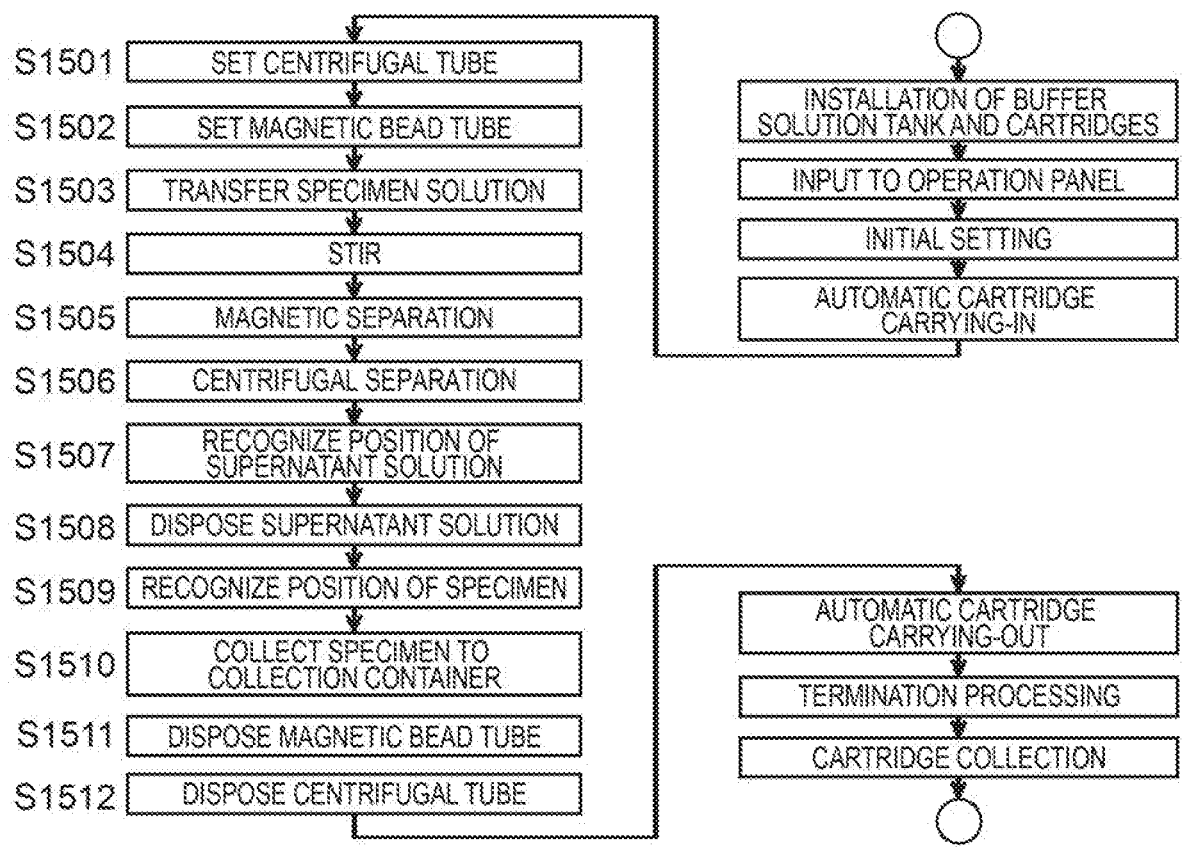
FIG. 15 is a diagram illustrating an exemplary operation flow of the inspection apparatus.

FIG. 15 is a diagram illustrating an exemplary operation flow of the inspection apparatus 1. As illustrated in an operator installs a buffer solution tank. Next, the operator installs the first cartridge 11 loaded with a specimen container C1 (containing a specimen) and the collection container C2, the second cartridge 12 loaded with the chip T, the third cartridge 13 loaded with the centrifugal tube C3, and the fourth cartridge 14 loaded with the magnetic bead tube C4 in each of the cartridge conveying mechanisms of the installation area. Then, the respective cartridges are automatically conveyed into the processing area.

The operator instructs designation of processing contents and start of automatic operation by the operation panel F, whereby automatic processing is started in the processing area.

In step S1501, the tube arm 2 takes out the centrifugal tube C3 from the third cartridge 13 and transfers it over the centrifugal separator 47. The centrifugal tube C3 is installed into the tube holding part 44 of the centrifugal separator 47.

In step S1502, the tube arm 2 takes out the magnetic bead tube C4 from the fourth cartridge 14, transfers it over the socket ring 45 of the rotary tube socket 4, and installs the magnetic bead tube C4 into the tube holding part 44 of the socket ring 45.

In step S1503, the socket ring 45 rotates to move the magnetic bead tube to an injection position. The injection position is a position where a specimen is injected from the chip T by the pipettor arm 3. The pipettor arm 3 is transferred over the second cartridge 12, is mounted with the chip T, and is transferred over the specimen container C1 of the first cartridge 11. The specimen is sucked from the specimen container C1 by the cylinder pump 152 for pipettor. The pipettor arm 3 is transferred over the magnetic bead tube C4 set in the socket ring 45. The specimen is discharged to the magnetic bead tube C4 by the cylinder pump 152 for pipettor and the specimen is injected into the magnetic bead tube C4. The pipettor arm 3 is transferred to a chip detaching jig J and the chip T is disposed.

In step S1504, the socket ring 45 of the rotary tube socket 4 transfers the magnetic bead tube C4 to a stirring position and the stirrer 6 stirs the specimen and mixes the specimen with magnetic beads.

In step S1505, the socket ring 45 transfers the magnetic bead tube C4 to a position of the magnetic separator 5, and a magnetic field is applied thereby. The magnetic beads having adsorbed unnecessary substances are gathered around an electromagnet of the magnetic separator 5. The pipettor arm 3 is transferred over the second cartridge 12, is mounted with the chip T, and is transferred over the magnetic bead tube C4. The specimen is sucked from the magnetic bead tube C4 by the cylinder pump 152 for pipettor, and the magnetic beads fixed by the magnetic separator 5 remain in the magnetic bead tube C4. The sucked specimen is removed of the unnecessary substances by the magnetic separation.

The pipettor arm 3 transfers the specimen (sucked) to the centrifugal tube C3 set in the centrifugal separator 47. The cylinder pump 152 for pipettor discharges the specimen into the centrifugal tube C3. The pipettor arm 3 is transferred to the chip detaching jig J and the chip T is disposed.

In step S1506, the centrifugal separator 47 is driven and centrifugal separation is performed. A target specimen then precipitates and an unnecessary solution is obtained a supernatant.

In step S1507, the recognition device 10 recognises a position of the supernatant solution centrifugally separated by the centrifugal separator 47. Furthermore, the tube arm 2 holds the centrifugal tube C3 and removes the centrifugal tube C3 frost the tube holding part 44. The posture of the tube arm 2 is changed from the first posture (holding the centrifugal tube C3) to the second posture, and the tube arm 2 reinstalls the centrifugal tube C3 into the tube holding part. The recognition device 10 recognizes a position of the supernatant solution in the centrifugal tube C3 reinstalled into the tube holding part 44.

In step S1508, the centrifugal separator 47 transfers the centrifugal tube C3 to a suction position. The pipettor arm 3 is transferred over the second cartridge 12, is mounted with the chip T, and is transferred over the centrifugal tube C3. The control device drives the pipettor arm 3 on the basis of the recognition result of the supernatant solution in the tube by the recognition device 10. The unnecessary supernatant solution is sucked from the centrifugal tube C3 by the cylinder pump 152 for pipettor. The pipettor arm 3 is transferred over the liquid waste port 93 and the supernatant solution is discharged by the cylinder pump 152 for pipettor and thereby disposed.

In step S1509, the centrifugal separator 47 transfers the centrifugal tube C3 below the dispensing nozzle 81. A buffer solution is dropped from the dispensing nozzle 81 by the buffer solution pump 154. After the buffer solution is dropped, a position of the specimen in the tube is recognized by the recognition device 10. Furthermore, the tube arm 2 holds the centrifugal tube C3 and removes the centrifugal tube C3 from the tube holding part 44. The posture of the tube arm 2 is changed from the first posture (holding the centrifugal tube C3) to the second posture, and the tube arm 2 reinstalls the centrifugal tube C3 into the tube holding part. The recognition device 10 recognizes a position of the specimen in the centrifugal tube C3 reinstalled in the tube holding part 44. In the case where the recognition result is insufficient for specifying the specimen position, the centrifugal tube C3 may be installed and reinstalled using another tube holding part to generate a recognition result of the specimen position.

In step S1510, the centrifugal separator 47 transfers the centrifugal tube C3 to a suction position. The control device 16 drives the pipettor arm 3 on the basis of the recognition result of the specimen position in the tube by the recognition device 10. The pipettor arm 3 is transferred over the centrifugal tube and the solution containing the precipitate as a target specimen is sucked from the centrifugal tube C3 by the cylinder pump 152 for pipettor. The pipettor arm 3 is transferred over the collection container C2, the solution containing the precipitate is discharged by the cylinder pump 152 for pipettor and the specimen solution is transferred to the collection container C2. The pipettor arm 3 is transferred to a chip detaching jig J and the chip T is disposed.

In step S1511, the socket ring 45 of the rotary tube socket 4 transfers the magnetic bead tube C4 below the holding knob operation part 7. The holding knob operation part 7 clamps the knob parts of the holding knobs 444 and 445 of the tube holding part 44 and drops the magnetic bead tube C4 to dispose it.

In step S1512, the centrifugal separator 47 transfers the centrifugal tube C3 below the holding knob operation part 7. The holding knob operation part 7 clamps the knob parts of the holding knobs 444 and 445 of the tube holding part 44 and drops the centrifugal tube C3 to dispose it. Steps S1511 and S1512 may foe performed simultaneously, or the order may be reversed.

After steps S1501 to S1512 are repeated for a specified number of times, the automatic processing is completed.

Each of the cartridges is automatically conveyed to the installation area by the respective cartridge conveying mechanisms.

The operator opens the installation gate G on the operation panel P and collects the cartridges.

In this flow, the recognition device 10 recognizes the supernatant solution and the specimen position in the tube, and then the centrifugal separator 47 is rotated to transfer the tube to a suction position of the pipettor arm 3. The position where the specimen position has been recognized by the recognition device 10 and the suction position may coincide.

In the inspection apparatus according to the present embodiment, a direction of a tube can be effectively changed by installing and reinstalling the tube into the tube holding part 44 by the tube arm 2. This allows a specimen position in the tube or unevenness of the specimen to be easily recognized using the recognition device 10.

Furthermore, since a dedicated mechanism for changing the direction of the tube is not required, the apparatus configuration can be simple and compact.

Furthermore, since the tube holding parts 44 are doubly arranged annularly in the socket ring 45 and the centrifugal separator 47, the rotation angle (direction change angle) θ of the tube can be changed in a wide range.

Furthermore, by using the method for recognizing a specimen position according to the present embodiment, position information of the specimen in the tube can be accurately obtained, and only a desired specimen can foe sucked by the pipettor arm 3.

In the present embodiment, it has been described that position information or unevenness of a specimen in a tube is accurately recognised. However, this is not limited to the specimen, and includes various substances such as substances, objects or targets in a container.

Second Embodiment

An inspection apparatus according to a second embodiment will be described with reference to FIG. 16.

Figure 16:
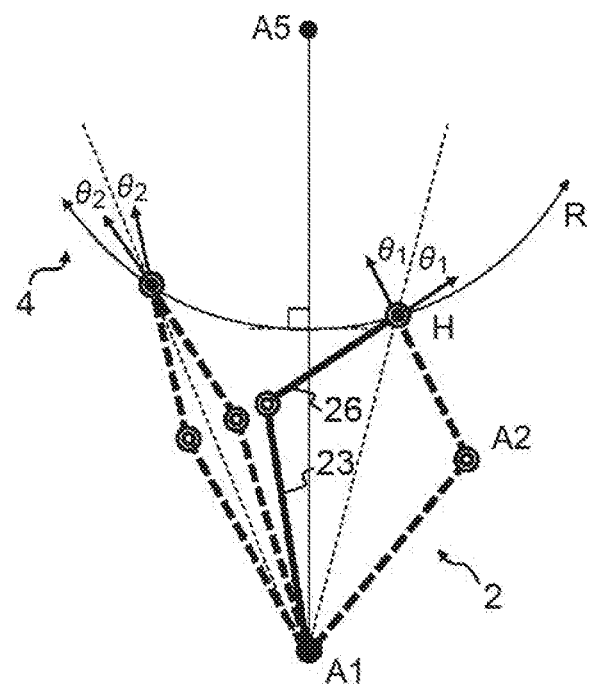
FIG. 16 is a diagram schematically illustrating a method for recognizing a specimen for an inspection apparatus according to a second embodiment.

FIG. 16 is a diagram schematically illustrating a method for recognizing a specimen of an inspection apparatus according to the second embodiment. As illustrated in FIG. 16, a point that a direction of a tube is changed by installing the tube into one tube holding part (also referred to as a first tube holding part) among a plurality of tube holding parts (on the trajectory R) and then reinstalling the tube into another tube holding part (also referred to as a second tube holding part) is different from the method for recognizing a specimen of the inspection apparatus according to the first embodiment.

By reinstalling the tube into another tube holding part 44, a rotation angle θ of the tube represents a difference dependent on the value of c expressed in the mathematical formula (2). That is, a rotation angle of the tube (tube direction) can be changed merely by reinstalling the tube (installed in one tube holding part at a position $\phi$) to another tube holding part located at a position $\phi$ different from the one tube holding part.

As described in the method for recognizing a specimen according to the first embodiment, there are two patterns of postures for holding a tube in one tube holding part (see FIG. 11). In the case where two tube holding parts are selected as in the present embodiment, two patterns of holding postures in one tube holding part and another two patterns of holding postures in another tube holding part allows a total of four patterns of rotation angles (tube direction) of the tube.

In the case where $\phi$ is not changed, it is only required to consider the relationships expressed by the mathematical formulas (1) and (2). When a change of $\phi$ is considered, however, it is necessary to derive a holding angle of the tube on a rotary tube socket (on the trajectory R).

Figure 17:
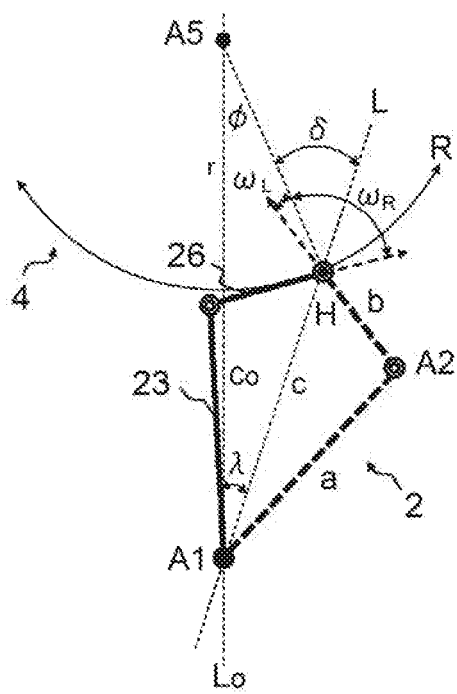
FIG. 17 is a diagram illustrating an exemplary holding angle of a tube or a desired point of a rotary tube socket.

FIG. 17 is a diagram illustrating an example of a holding angle of a tube at a desired point (on the trajectory R) of the rotary tube socket.

Here, a holding angle of a tube means an angle formed by a line segment connected between a point A5 which is the center of the rotary tube socket and a point H which is a tube holding point of the first holding mechanism and a line segment connected between the point H and a point A2 (second rotation axis A2 of a second link). As illustrated in FIG. 17, holding angles at a desired point on R are $\omega_L$ and $\omega_R$ depending on the posture of links. Each of the above is expressed by the following mathematical formulas (3).

$$\delta = \phi + \lambda \quad (3)$$
$$\omega_L = \theta - \delta$$
$$\omega_R = \theta + \delta$$
$$\lambda = \arccos\left(\frac{c^2 + (r+c_0)^2 - r^2}{2c(r+c_0)}\right)$$

$\lambda$ is an angle formed by the line segment connected between the points A5 and A1 and a linear line L. $\delta$ is an angle expressed by the sum of $\phi$ and $\lambda$.

By using the method for recognizing a specimen in the specimen apparatus according to the present embodiment, for example, when a tube containing a specimen aligned in a prescribed direction on a cartridge (position information of the specimen in a predetermined direction is known in advance) is directly installed into the centrifugal separator, by installing the tube at a position $\phi$ that provides a desired angle $\theta$ at the time of installation, a procedure for installing and reinstalling the tube on the centrifugal separator can be omitted.

In addition, by changing values of r and $\phi$ using one of the tube holding parts not installed with a tube among the tube holding parts in the centrifugal separator and the socket ring, a rotation angle (tube direction) of the tube can be changed.

Furthermore, the method for recognizing a specimen position according to the present embodiment and the method for recognizing a specimen position according to the first embodiment can be used in a desired combination.

In addition, based on a recognition result of a specimen position in a tube when the tube has been installed in one tube holding part, the control device 16 may derive another tube holding part to install the tube among all tube holding parts.

Third Embodiment

An inspection apparatus according to a third embodiment will be described with reference to FIGS. 18A and 18B.

Figure 18A:
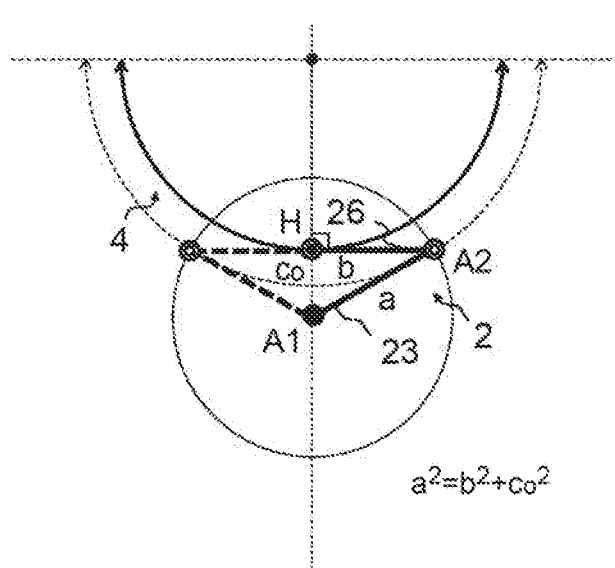
FIGS. 18A and 18B are diagrams schematically illustrating a method for recognizing a specimen for an inspection apparatus according to a third embodiment.
Figure 18B:
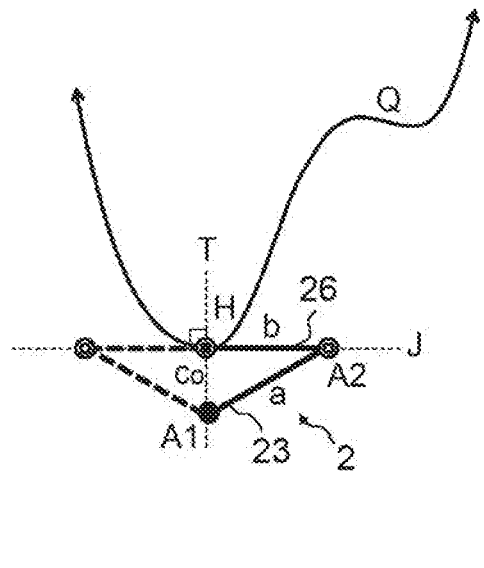

FIGS. 18A and 18B are diagrams schematically illustrating a method for recognizing a specimen in the inspection apparatus according to the third embodiment.

In the case of changing a direction of the tube as described above, two patterns of holding postures may be taken with respect to one tube holding part. As a result, since rotation directions of a tube include two patterns of CCW and CM, if $2\theta_0$ of the maximum 180 degrees can be obtained, replacing one time is sufficient for all angles.

When installing and reinstalling a tube into the same tube holding part (same position $\phi$) as illustrated in FIGS. 18A and 18B, a case where an angle of 180 degrees can be obtained only by reinstalling one time is when H is $H_0$ and $\phi$ is $\phi_0$. A relationship among a, b and $c_0$ here is expressed by the following mathematical formula (4).

$$a^2 = b^2 + c_0^2 \quad (4)$$

A right triangle is formed by a, b and $c_0$ as expressed by the mathematical formula (4).

Since $2\theta_0$ is 180 degrees under the above conditions, the method according to the present embodiment can foe used in the case where the above conditions are satisfied and rapidity of changing the direction of the tube is prioritized. In FIG. 18A, it is assumed that a moving trajectory of the tube is circular. However, the method according to the present embodiment can be applied to any trajectory other than a circle as illustrated in FIG. 18B. As illustrated in FIG. 18B, Q is a trajectory of conveying a tube, J is a tangent line at a point on Q, and T is a perpendicular to J at a point of contact between J and Q. A1 is located on T.

As conditions corresponding to FIG. 18A, if conditions of the mathematical formulas (5) are further satisfied, an operation range of links can be reduced and a rotation angle of the tube can be 180 degrees.

$$r = b = c_0$$
$$a = r\sqrt{2} \quad (5)$$

Figure 19:
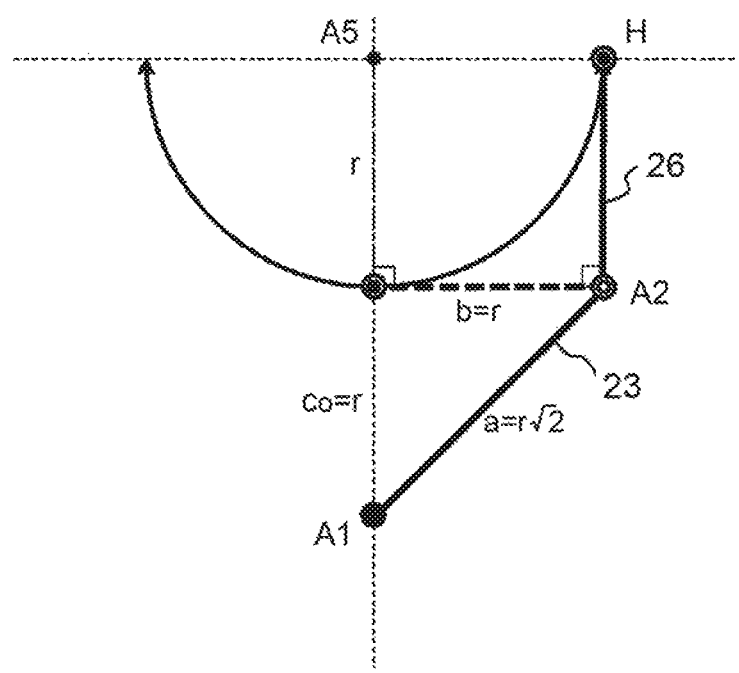
FIG. 19 is a diagram illustrating positions of links when conditions of mathematical formulas (5) are satisfied.

FIG. 19 is a diagram illustrating positions of links when the conditions of the mathematical formulas (5) are satisfied. As illustrated in FIG. 19, when the second link 26 is rotated by exactly 90 degrees while the position of the first link 23 is fixed, the direction of the tube can be changed by 180 degrees.

As result, a direction of the tube can be effectively changed with a less action of the tube arm.

In the embodiment described above, the tube arm 2 has been described as having two links. However, the number of links is not limited to two and may be two or more.

Furthermore, the tube holding part or the first holding mechanism at a tip of the tube arm may have a rotation mechanism that allows a tube to rotate about the central axis of the tube. Even if an operating range of the rotation mechanism is limited, a direction of the tube can be changed over a wide range beyond the operating range of the rotation mechanism by applying the embodiment described above.

In the embodiment described above, recognizing the specimen position in the tube on the basis of the two recognition results has been mainly explained. However, a specimen position may be recognized based on a plurality of recognition results without being limited to the two recognition results.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An inspection apparatus comprising:
   at least one container to contain an object;
   a socket including a plurality of container holding parts each configured to hold the container in which the object is contained;

a first arm including
a first rotation shaft located at an outer side of the socket,
a first link of which one end is connected to the first rotation shaft and rotatable about the first rotation shaft,
a second rotation shaft connected to the other end of the first link and substantially parallel to the first rotation shaft,
a second link of which one end is connected to the second rotation shaft and rotatable about the second rotation shaft, and
a holder connected to the other end of the second link and being able to hold the container;
a control device that drives the holder of the first arm to hold the container, to install the container into a container holding part of the container holding parts when the first and second links are in a first posture, to remove the container from the container holding part, and to reinstall the container into the container holding part when the first and second links are in a second posture different from the first posture; and
a recognition device that obtains at least recognition results indicating a first position of the object in the container when the container is installed into the container holding part in the first posture, and a second position of the object in the container when the container is reinstalled into the container holding part in the second posture.

2. The inspection apparatus according to claim 1, wherein
the first posture indicates a position of the holder, a position of the first rotation shaft and a position of the second rotation shaft when the holder installs the container into a first container holding part in the socket, and
the second posture indicates a position of the holder, a position of the first rotation shaft and a position of the second rotation shaft when the holder reinstalls the container into the first container holding part in the socket.

3. The inspection apparatus according to claim 1, wherein
the first posture indicates a position of the holder, a position of the first rotation shaft and a position of the second rotation shaft when the holder installs the container into a first container holding part in the socket, and
the second posture indicates a position of the holder, a position of the first rotation shaft and a position of the second rotation shaft when the holder reinstalls the container into a second container holding part different from the first container holding part in the socket.

4. The inspection apparatus according to claim 1, wherein
the container holding parts are annularly arranged around a third rotation shaft which is a center of the socket, and
the socket is rotatable about the third rotation shaft.

5. The inspection apparatus according to claim 4, wherein the socket includes
a first socket that annularly arranges the container holding parts around the third rotation shaft, and
a second socket positioned outside of the first socket, that annularly arranges the container holding parts around the third rotation shaft,
the first socket and the second socket being individually rotatable about the third rotation shaft.

6. The inspection apparatus according to claim 1, further comprising:
a second arm being able to suck the object in the container.

7. The inspection apparatus according to claim 6, wherein the control device controls driving of the second arm, based on the recognition results.

8. An inspection apparatus comprising:
at least one container to contain an object;
a socket having a plurality of container holding parts each configured to hold the container in which the object is contained;
a first arm including a first rotation shaft located at an outer side of the socket,
a first link of which one end is connected to the first rotation shaft and rotatable about the first rotation shaft,
a second rotation shaft connected to the other end of the first link and substantially parallel to the first rotation shaft,
a second link of which one end is connected to the second rotation shaft and rotatable about the second rotation shaft, and
a holder connected to the other end of the second link and being able to hold the container;
a second arm being able to suck the object in the container;
a control device that drives the holder of the first arm to hold the container, to install the container into a container holding part of the container holding parts when the first and second links are in a first posture, to remove the container from the container holding part, and to reinstall the container into the container holding part when the first and second links are in a second posture different from the first posture; and
a recognition device that obtains at least a first recognition result indicating a position of the object in the container when the container is installed into the container holding part in the first posture, and a second recognition result indicating a position of the object in the container when the container is reinstalled into the container holding part in the second posture,
wherein the control device controls driving of the second arm, based on the first recognition result and the second recognition result.

9. The inspection apparatus according to claim 8, wherein
the container holding parts are annularly arranged in the socket and rotatable about a center of the socket, and
the control device controls driving of the socket based on the first recognition result.

10. An inspection method in an inspection apparatus comprising
at least one container to contain an object;
a socket having a container holding part configured to hold the container in which the object is contained,
a first arm including
a first rotation shaft located at an outer side of the socket,
a first link of which one end is connected to the first rotation shaft and rotatable about the first rotation shaft,
a second rotation shaft connected to the other end of the first link and substantially parallel to the first rotation shaft,
a second link of which one end is connected to the second rotation shaft and rotatable about the second rotation shaft, and
a holder connected to the other end of the second link and being able to hold the container,
a control device that drives the holder of the first arm, and
a recognition device that obtains a recognition result indicating a position of the object in the container, the inspection method comprising:

holding, by the holder of the first arm driven by the control device, the container;

installing, by the holder of the first arm driven by the control device, the container into the container holding part in a first posture;

removing, by the holder of the first arm driven by the control device, the container from the container holding part;

reinstalling, by the holder of the first arm driven by the control device, the container into the container holding part in a second posture different from the first posture; and obtaining, by the recognition device, a first recognition result when the container is installed into the container holding part in the first posture, and a second recognition result when the container is reinstalled into the container holding part in the second posture.

* * * * *